United States Patent
Wang et al.

(10) Patent No.: US 10,686,571 B2
(45) Date of Patent: Jun. 16, 2020

(54) METHOD AND APPARATUS FOR SIGNALING CONFIGURATION

(71) Applicant: ZTE Corporation, Shenzhen, Guangdong (CN)

(72) Inventors: Yuxin Wang, Guangdong (CN); Yijian Chen, Guangdong (CN); Yu Ngok Li, Guangdong (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 15/934,993

(22) Filed: Mar. 24, 2018

(65) Prior Publication Data

US 2018/0351713 A1 Dec. 6, 2018

Related U.S. Application Data

(63) Continuation of application No. PCT/CN2016/093966, filed on Aug. 8, 2016.

(30) Foreign Application Priority Data

Sep. 25, 2015 (CN) .......................... 2015 1 0624710

(51) Int. Cl.
*H04L 27/26* (2006.01)
*H04W 72/04* (2009.01)
(Continued)

(52) U.S. Cl.
CPC .............. *H04L 5/0048* (2013.01); *H04L 1/00* (2013.01); *H04L 27/2613* (2013.01);
(Continued)

(58) Field of Classification Search
CPC ............... H04L 5/0048; H04L 27/2607; H04L 27/2613; H04W 72/0406; H04W 72/0446; H04W 76/27
See application file for complete search history.

(56) References Cited

U.S. PATENT DOCUMENTS 9,300,452 B2 * 3/2016 Yang ..................... H04W 72/02
9,503,892 B2 * 11/2016 Bashar .............. H04W 52/0251
(Continued)

FOREIGN PATENT DOCUMENTS

| CN | 101159476 A | 4/2008 |
| CN | 101868027 A | 10/2010 |
| WO | 2013/141515 A1 | 9/2013 |

OTHER PUBLICATIONS

International Search Report and Written Opinion dated Oct. 27, 2016 for International Application No. PCT/CN2016/093966, filed on Aug. 8, 2016 (14 pages).

*Primary Examiner* — Rasheed Gidado
(74) *Attorney, Agent, or Firm* — Perkins Coie LLP

(57) ABSTRACT

The present disclosure provides a method for signaling configuration. The method includes: signaling, by a base station, a first special subframe configuration and a second special subframe configuration to a User Equipment (UE) via a first signaling message and a second signaling message. The first special subframe configuration is determined by the base station and the UE based on the first signaling message, and the second special subframe configuration is determined by the base station and the UE based on the first signaling message and the second signaling message or based on the second signaling message. With the above method, the problem associated with low multiplexing capacity of Sounding Reference Signals (SRSs) can be solved and the multiplexing capacity of SRSs can be improved.

16 Claims, 7 Drawing Sheets

---

Base station signals a first special subframe configuration and a second special subframe configuration to UE via a first signaling message and a second signaling message — S602

Base station and UE determine the first special subframe configuration based on the first signaling message, and determine the second special subframe configuration based on the first signaling message and the second signaling message or based on the second signaling message — S604

(51) Int. Cl.
*H04W 76/27* (2018.01)
*H04L 5/00* (2006.01)
*H04L 1/00* (2006.01)

(52) U.S. Cl.
CPC ....... *H04W 72/0406* (2013.01); *H04W 76/27* (2018.02); *H04L 1/0079* (2013.01); *H04L 27/2607* (2013.01); *H04W 72/042* (2013.01); *H04W 72/0446* (2013.01)

(56) References Cited

U.S. PATENT DOCUMENTS

| | | | |
|---|---|---|---|
| 9,839,030 B2 * | 12/2017 | Zheng | H04W 72/0446 |
| 2013/0343356 A1 * | 12/2013 | Bai | H04W 72/0446 |
| | | | 370/336 |
| 2014/0198773 A1 * | 7/2014 | Yin | H04L 5/001 |
| | | | 370/336 |
| 2014/0328229 A1 * | 11/2014 | Ahn | H04W 56/0005 |
| | | | 370/280 |
| 2015/0085715 A1 * | 3/2015 | Sun | H04B 7/2656 |
| | | | 370/280 |
| 2016/0157248 A1 * | 6/2016 | Lin | H04W 24/00 |
| | | | 370/329 |
| 2018/0213552 A1 * | 7/2018 | Wei | H04L 5/0051 |

* cited by examiner

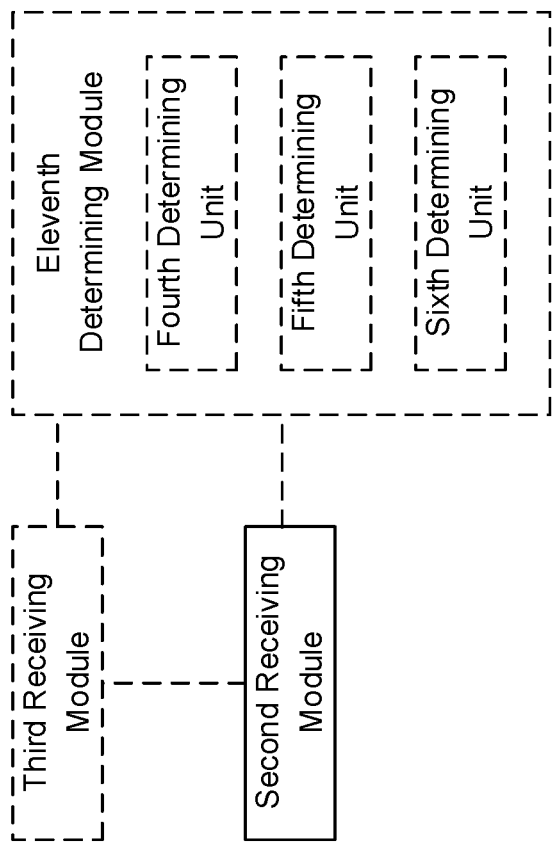
FIG. 11
FIG. 13
FIG. 12

METHOD AND APPARATUS FOR SIGNALING CONFIGURATION

CROSS REFERENCE TO RELATED APPLICATIONS

This patent document is a continuation of and claims the benefit of priority to International Patent Application No. PCT/CN2016/093966, filed on Aug. 8, 2016, which claims the benefit of priority of Chinese Patent Application No. 201510624710.6, filed on Sep. 25, 2015. The entire contents of the before-mentioned patent applications are incorporated by reference as part of the disclosure of this application.

TECHNICAL FIELD

The present disclosure relates to, but not limited to, communication technology, and more particularly, to a method and an apparatus for signaling configuration.

BACKGROUND

Radio Frames in Long Term Evolution (LTE) systems include frame structures in a Frequency Division Duplex (FDD) mode and a Time Division Duplex (TDD) mode. In a frame structure in the FDD mode, as shown in FIG. 1, a radio frame of 10 milliseconds (ms) consists of 20 slots, numbered from 0 to 19, each having a length of 0.5 ms. The slot 2i and the slot 2i+1 form a subframe i having a length of 1 ms. In a frame structure in the TDD mode, as shown in FIG. 2, a radio frame of 10 ms consists of two half frames each including five subframes each having a length of 1 ms. A subframe i is defined as two slots 2i and 2i+1, each having a length of 0.5 ms.

In the above two frame structures, for a normal Cyclic Prefix (CP), a slot contains 7 symbols each having a length of 66.7 microseconds (μs), with the first symbol having a CP length of 5.21 μs and the remaining six symbols each having a CP length of 4.69 μs. For an extended CP, a slot contains 6 slots each having a CP length of 16.67 μs. A time unit $T_s$ is defined as $T_s=1/(15000 \times 2048)$ seconds. The supported uplink-downlink configurations are shown in Table 1 below. For each subframe in a radio frame, "D" represents a subframe dedicated for downlink transmission, "U" represents a subframe dedicated for uplink transmission, and "S" represents a special subframe for three fields: a Downlink Pilot Time Slot (DwPTS), an Uplink Pilot Time Slot (UpPTS) and a Guard Period (GP). The lengths of DwPTS and UpPTS are shown in Table 2, subject to a constraint that the total length of DwPTS, GP and UpPTS is $30720 \cdot T_s = 1$ ms. Each subframe i is represented by two slots 2i and 2i+1. Each slot has a length of $T_{slot}=15360 \cdot T=0.5$ ms.

The LTE TDD supports an uplink-downlink switching period of 5 ms or 10 ms. If the period of the downlink-to-uplink switching point is 5 ms, the special subframe will occur in each of the two half frames. If the period of the downlink-to-uplink switching point is 5 ms, the special subframe will occur in the first half frame only. Subframe 0, Subframe 5 and the DwPTS are always used for downlink transmission, while the UpPTS and the subframe immediately following the special subframe are dedicated for uplink transmission.

TABLE 1

Uplink-Downlink Configuration

| Uplink-Downlink Configurations | Downlink-Uplink Switching Point Period | Subframe No. 0 | 1 | 2 | 3 | 4 | 5 | 6 | 7 | 8 | 9 |
|---|---|---|---|---|---|---|---|---|---|---|---|
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2

Special Subframe Configuration (DwPTS/GP/UpPTS Length)

| Special Subframe Configuration | Normal CP, Downlink | | | Extended CP, Downlink | | |
|---|---|---|---|---|---|---|
| | | UpPTS | | | UpPTS | |
| | DwPTS | Normal CP, Uplink | Extended CP, Uplink | DwPTS | Normal CP, Uplink | Extended CP, Uplink |
| 0 | 6592·$T_s$ | 2192·$T_s$ | 2560·$T_s$ | 7680·$T_s$ | 2192·$T_s$ | 2560·$T_s$ |
| 1 | 19760·$T_s$ | | | 20480·$T_s$ | | |
| 2 | 21952·$T_s$ | | | 23040·$T_s$ | | |
| 3 | 24144·$T_s$ | | | 25600·$T_s$ | | |
| 4 | 26336·$T_s$ | | | 7680·$T_s$ | 4384·$T_s$ | 5120·$T_s$ |
| 5 | 6592·$T_s$ | 4384·$T_s$ | 5120·$T_s$ | 20480·$T_s$ | | |
| 6 | 19760·$T_s$ | | | 23040·$T_s$ | | |
| 7 | 21952·$T_s$ | | | — | — | — |
| 8 | 24144·$T_s$ | | | — | — | — |

In the LTE, a Physical Downlink Control Channel (PDCCH) carries uplink and downlink scheduling information as well as uplink power control information. There are various Downlink Control Information (DCI) format: 0, 1, 1A, 1B, 1C, 1D, 2, 2A, 3, 3A, etc. A base station, also known as evolved NodeB (eNB), can configure a terminal device, also known as User Equipment (UE), via DCI. Alternatively, a terminal device can receive a higher layer configuration. In other words, a UE can be configured via higher layer signaling.

Broadcast information in the LTE system includes Master Information Block (MIB) and System Information Block (SIB). The MIB is transmitted on Physical Broadcast Channel (PBCH) and the SIB, also known as Scheduled Information (SI), is transmitted on Physical Downlink Shared Channel (PDSCH). Depending on scheduling requirements (e.g., periods), the SIB information can be divided into several pieces of SI for transmission. At least four pieces of SI are supported, i.e., SIB-1, SIB-2, SIB-3 and SIB-4.

Sounding Reference Signal (SRS) is a signal used for measuring wireless Channel State Information (CSI) between the terminal device and the base station. In the LTE system, the UE transmits an uplink SRS at the last data symbol in a transmission subframe in accordance with parameters indicated by the eNB, such as a bandwidth, a frequency position, a sequence cyclic shift, a period and a subframe offset. The eNB determines the uplink CSI of the UE based on the received SRS and performs operations, such as frequency-domain selection and scheduling, closed-loop power control and the like, based on the determined CSI.

Within one single SRS bandwidth, a number of UEs may transmit SRSs in one single frequency bin with different cyclic shifts by means of code division multiplexing, or two UEs can transmit SRSs in different frequency bins by means of frequency division multiplexing. For example, in the LTE system, a UE can use one of eight cyclic shifts and one of two frequency bins for transmitting an SRS within a particular SRS bandwidth (i.e., four Resource Blocks (RBs)). That is, the UE has in total 16 resources available for SRS transmission. In other word, up to 16 SRSs can be transmitted simultaneously within the SRS bandwidth. Since the LTE system does not support Single User-Multiple Input Multiple Output (SU-MIMO) in uplink, the UE can only transmit an SRS via one antenna at a time. Hence, one UE only needs one SRS. Accordingly, up to 16 UEs can be multiplexed within the above SRS bandwidth.

The LTE-Advanced (LTE-A) system is the next generation of the LTE system. It supports SU-MIMO in uplink and can use up to four antennas for uplink transmission. That is, a UE can transmit an SRS via more than one antenna simultaneously and an eNB needs to estimate the state of each channel based on the SRS received at each antenna.

In a related LTE-A research, it has been proposed to use a non-precoded (i.e., antenna specific) SRS in uplink communications. In this case, when a UE transmits a non-precoded SRS using multiple antennas, the SRS resources required for each UE will increase, resulting in a reduced number of UEs that can be multiplexed simultaneously in the system. Further, in addition to the periodic SRS transmission in the LTE, it is possible to configure a UE to transmit SRSs aperiodically via DCI or higher layer signaling.

For example, within a particular SRS bandwidth (i.e., 4 RBs), if each UE transmits an SRS via four antennas, it will require 4 resources. Recall that 16 SRS resources in total can be supported in one SRS bandwidth, the number of UEs that can be multiplexed within this SRS bandwidth is reduced to 4. Accordingly, the number of UEs that can be multiplexed simultaneously in the system is reduced to ¼ of that in the LTE system. In a related LTE-A Release 10 research, it has been proposed that a UE can be triggered to transmit an SRS via higher layer signaling (also referred to as trigger type 0) or DCI (also referred to as trigger type 1). The SRS triggered via higher laying signaling is a periodic SRS and the SRS triggered via DCI is an aperiodic SRS. In the LTE-A Release 10, the aperiodic SRS transmission is introduced, which improves utilization of the SRS resources and flexibility in resource scheduling to some extent.

In a future LTE-A Release 13 research, in a scenario of Full Dimension-MIMO (FD-MIMO) or Massive-MIMO, with the increase in demands for SRS measurements by TDD channel reciprocity and the increase in the number of UEs to be multiplexed, it is difficult for the current multiplexing capacity of SRSs to fulfill those requirements.

SUMMARY

A summary of the subject matters described in the present disclosure will be given below. The scopes of the claims are not limited to the summary.

The embodiments of the present disclosure provide a method and an apparatus for signaling configuration, capable of solving the problem associated with low multiplexing capacity of SRSs in the related art.

In a first aspect of the embodiments of the present disclosure, a method for signaling configuration is provided. The method includes: signaling, by a base station, a first special subframe configuration and a second special subframe configuration to a User Equipment (UE) via a first signaling message and a second signaling message. The first special subframe configuration is determined by the base station and the UE based on the first signaling message, and the second special subframe configuration is determined by the base station and the UE based on the first signaling message and the second signaling message or based on the second signaling message.

Optionally, the base station signaling the first special subframe configuration and the second special subframe configuration to the UE via the first signaling message and the second signaling message includes: selecting, by the base station, the first special subframe configuration and the second special subframe configuration from a set of special subframe configurations, and transmitting the first special subframe configuration and the second special subframe configuration to the UE via the first signaling message and the second signaling message, respectively. The first signaling message and the second signaling message are each a broadcast signaling message carried in a System Information Block (SIB) for indicating special subframe configuration. Alternatively, the base station signaling the first special subframe configuration and the second special subframe configuration to the UE via the first signaling message and the second signaling message includes: selecting, by the base station, the first special subframe configuration from the set of special subframe configurations, transmitting the first special subframe configuration to the UE via the first signaling message, and indicating the second special subframe configuration to the UE via the second signaling message. The first signaling message is a broadcast signaling message carried in a SIB for indicating the first special subframe configuration, and the second signaling message is a broadcast signaling message carried in a SIB or in a UE-specific Radio Resource Control (RRC) signaling message for indicating the second special subframe configuration. A special subframe indicated in the first special subframe configuration contains M time-domain symbols for Sounding Reference Signal (SRS) transmission or M Uplink Pilot Time Slot (UpPTS) symbols, where M is an integer and $1 \le M \le 2$. A special subframe indicated in the second special subframe configuration contains N time-domain symbols for SRS transmission or N UpPTS symbols, where N is an integer and $3 \le N \le 10$.

Optionally, the first special subframe configuration is a normal special subframe configuration and the second special subframe configuration is an extended special subframe configuration.

Optionally, the first special subframe configuration includes one of:

Special Subframe Configuration 0: when a normal Cyclic Prefix (CP) is used in downlink, a Downlink Pilot Time Slot (DwPTS) in the special subframe occupies 3 time-domain symbols and the UpPTS in the special subframe occupies 1 time-domain symbol;

Special Subframe Configuration 1: when a normal CP is used in downlink, the DwPTS in the special subframe occupies 9 time-domain symbols and the UpPTS in the special subframe occupies 1 time-domain symbol;

Special Subframe Configuration 2: when a normal CP is used in downlink, the DwPTS in the special subframe occupies 10 time-domain symbols and the UpPTS in the special subframe occupies 1 time-domain symbol;

Special Subframe Configuration 3: when a normal CP is used in downlink, the DwPTS in the special subframe occupies 11 time-domain symbols and the UpPTS in the special subframe occupies 1 time-domain symbol;

Special Subframe Configuration 4: when a normal CP is used in downlink, the DwPTS in the special subframe occupies 12 time-domain symbols and the UpPTS in the special subframe occupies 1 time-domain symbol;

Special Subframe Configuration 5: when a normal CP is used in downlink, the DwPTS in the special subframe occupies 3 time-domain symbols and the UpPTS in the special subframe occupies 2 time-domain symbols;

Special Subframe Configuration 6: when a normal CP is used in downlink, the DwPTS in the special subframe occupies 9 time-domain symbols and the UpPTS in the special subframe occupies 2 time-domain symbols;

Special Subframe Configuration 7: when a normal CP is used in downlink, the DwPTS in the special subframe occupies 10 time-domain symbols and the UpPTS in the special subframe occupies 2 time-domain symbols;

Special Subframe Configuration 8: when a normal CP is used in downlink, the DwPTS in the special subframe occupies 11 time-domain symbols and the UpPTS in the special subframe occupies 2 time-domain symbols; or Special Subframe Configuration 9: when a normal CP is used in downlink, the DwPTS in the special subframe occupies 6 time-domain symbols and the UpPTS in the special subframe occupies 2 time-domain symbols.

Optionally, the second special subframe configuration is one of a plurality of special subframe configurations satisfying a condition that: when a normal CP is used in downlink, the DwPTS in the special subframe occupies P time-domain symbols and the UpPTS in the special subframe occupies N time-domain symbol, where P is an integer, $P+N \leq 13$ and $P \geq 1$.

Optionally, the second special subframe configuration is one of a plurality of special subframe configurations satisfying a condition that: when a normal CP is used in downlink, the DwPTS in the special subframe occupies P time-domain symbols and the UpPTS in the special subframe occupies N time-domain symbol, where P is an integer, $P+N \leq 13$ and $6 \leq P \leq 8$, or when a normal CP is used in downlink, the DwPTS in the special subframe occupies P time-domain symbols and the UpPTS in the special subframe occupies N time-domain symbol, where P is an integer, $P+N \leq 13$ and $1 \leq P \leq 5$.

Optionally, the second special subframe configuration is determined based on the first signaling message and the second signaling message by:

determining, by the base station and the UE, the first special subframe configuration based on the first signaling message, so as to obtain a number of time-domain symbols occupied by a Downlink Pilot Time Slot (DwPTS) or a number of time-domain symbols occupied by a Guard Period (GP) in the first special subframe configuration; and determining, by the base station and the UE, a number of time-domain symbols occupied by an Uplink Pilot Time Slot (UpPTS) in the second special subframe configuration based on the second signaling message, and determining, by the base station and the UE, a number of time-domain symbols occupied by a DwPTS or a number of time-domain symbols occupied by a GP in the second special subframe configuration, based on the number of time-domain symbols occupied by the DwPTS in the first special subframe configuration; or determining, by the base station and the UE, the number of time-domain symbols occupied by the UpPTS in the second special subframe configuration based on the second signaling message, and determining, by the base station and the UE, the number of time-domain symbols occupied by the DwPTS or the number of time-domain symbols occupied by the GP in the second special subframe configuration, based on the number of time-domain symbols occupied by the GP in the first special subframe configuration.

Optionally, the operation of determining the number of time-domain symbols occupied by the DwPTS or the number of time-domain symbols occupied by the GP in the second special subframe configuration based on the number of time-domain symbols occupied by the DwPTS in the first special subframe configuration includes:

determining the number of time-domain symbols occupied by the DwPTS in the second special subframe configuration to be equal to the number of time-domain symbols occupied by the DwPTS in the first special subframe configuration, or determining the number of time-domain symbols occupied by the GP in the second special subframe configuration to be equal to (14−the number of time-domain symbols occupied by the UpPTS in the second special subframe configuration−the number of time-domain symbols occupied by the DwPTS in the first special subframe configuration).

Optionally, the operation of determining the number of time-domain symbols occupied by the DwPTS or the number of time-domain symbols occupied by the GP in the second special subframe configuration based on the number of time-domain symbols occupied by the GP in the first special subframe configuration includes:

determining the number of time-domain symbols occupied by the DwPTS in the second special subframe configuration to be equal to (14−the number of time-domain symbols occupied by the UpPTS in the second special subframe configuration−the number of time-domain symbols occupied by the GP in the first special subframe configuration), or determining the number of time-domain symbols occupied by the GP in the second special subframe configuration to be equal to the number of time-domain symbols occupied by the GP in the first special subframe configuration.

Optionally, when the second signaling message is a System Information Block (SIB) broadcast signaling message and the SIB broadcast signaling message is configured by the base station or configured by the base station to be valid, the second signaling message indicates at least one of: a number of time-domain symbols occupied by an Uplink Pilot Time Slot (UpPTS) in a special subframe for the UE is larger than 3; a number of time-domain symbols occupied by a Downlink Pilot Time Slot (DwPTS) in the special subframe for the UE equals to a number of time-domain symbols occupied by a DwPTS indicated in the first special subframe configuration; or a number of time-domain symbols occupied by a Guard Period (GP) in the special subframe for the UE equals to a number of time-domain symbols occupied by a GP indicated in the first special subframe configuration. Alternatively, when the second signaling message is a Radio Resource Control (RRC) signaling message, the second signaling message indicates at least one of: the number of time-domain symbols occupied by the UpPTS in the special subframe for the UE equals to 1 or 2; the number of time-domain symbols occupied by the UpPTS in the special subframe for the UE is larger than 3 and the number of time-domain symbols occupied by the DwPTS in the special subframe for the UE equals to the number of time-domain symbols occupied by the DwPTS indicated in the first special subframe configuration; or the number of time-domain symbols occupied by the UpPTS in the special subframe for the UE is larger than 3 and the number of time-domain symbols occupied by the GP in the special subframe for the UE equals to the number of time-domain symbols occupied by the GP indicated in the first special subframe configuration.

In a second aspect of the embodiments of the present disclosure, a method for signaling configuration is provided. The method includes: receiving, by a User Equipment (UE), a first special subframe configuration and a second special subframe configuration via a first signaling message and a second signaling message transmitted from a base station. The first special subframe configuration is determined by the base station and the UE based on the first signaling message, and the second special subframe configuration is determined by the base station and the UE based on the first signaling message and the second signaling message or based on the second signaling message.

Optionally, the UE receiving the first special subframe configuration and the second special subframe configuration via the first signaling message and the second signaling message transmitted from the base station includes: receiving, by the UE, the first special subframe configuration via the first signaling message and the second special subframe configuration via the second signaling message. The first signaling message and the second signaling message are each a broadcast signaling message carried in a System Information Block (SIB) for indicating special subframe configuration. Alternatively, the UE receiving the first special subframe configuration and the second special subframe configuration via the first signaling message and the second signaling message transmitted from the base station includes: receiving, by the UE, the first special subframe configuration via the first signaling message, and information indicating the second special subframe configuration via the second signaling message. The first signaling message is a broadcast signaling message carried in a SIB for indicating the first special subframe configuration, and the second signaling message is a broadcast signaling message carried in a SIB or in a UE-specific Radio Resource Control (RRC) signaling message for indicating the second special subframe configuration. A special subframe indicated in the first special subframe configuration contains M time-domain symbols for Sounding Reference Signal (SRS) transmission or M Uplink Pilot Time Slot (UpPTS) symbols, where M is an integer and $1 \leq M \leq 2$. A special subframe indicated in the second special subframe configuration contains N time-domain symbols for SRS transmission or N UpPTS symbols, where N is an integer and $3 \leq N \leq 10$.

Optionally, the first special subframe configuration is a normal special subframe configuration and the second special subframe configuration is an extended special subframe configuration.

Optionally, the first special subframe configuration includes one of:

Special Subframe Configuration 0: when a normal Cyclic Prefix (CP) is used in downlink, a Downlink Pilot Time Slot (DwPTS) in the special subframe occupies 3 time-domain symbols and the UpPTS in the special subframe occupies 1 time-domain symbol;

Special Subframe Configuration 1: when a normal CP is used in downlink, the DwPTS in the special subframe occupies 9 time-domain symbols and the UpPTS in the special subframe occupies 1 time-domain symbol;

Special Subframe Configuration 2: when a normal CP is used in downlink, the DwPTS in the special subframe occupies 10 time-domain symbols and the UpPTS in the special subframe occupies 1 time-domain symbol;

Special Subframe Configuration 3: when a normal CP is used in downlink, the DwPTS in the special subframe occupies 11 time-domain symbols and the UpPTS in the special subframe occupies 1 time-domain symbol;

Special Subframe Configuration 4: when a normal CP is used in downlink, the DwPTS in the special subframe occupies 12 time-domain symbols and the UpPTS in the special subframe occupies 1 time-domain symbol;

Special Subframe Configuration 5: when a normal CP is used in downlink, the DwPTS in the special subframe occupies 3 time-domain symbols and the UpPTS in the special subframe occupies 2 time-domain symbols;

Special Subframe Configuration 6: when a normal CP is used in downlink, the DwPTS in the special subframe occupies 9 time-domain symbols and the UpPTS in the special subframe occupies 2 time-domain symbols;

Special Subframe Configuration 7: when a normal CP is used in downlink, the DwPTS in the special subframe occupies 10 time-domain symbols and the UpPTS in the special subframe occupies 2 time-domain symbols;

Special Subframe Configuration 8: when a normal CP is used in downlink, the DwPTS in the special subframe occupies 11 time-domain symbols and the UpPTS in the special subframe occupies 2 time-domain symbols; or Special Subframe Configuration 9: when a normal CP is used in downlink, the DwPTS in the special subframe occupies 6 time-domain symbols and the UpPTS in the special subframe occupies 2 time-domain symbols.

Optionally, the second special subframe configuration is one of a plurality of special subframe configurations satisfying a condition that: when a normal CP is used in downlink, the DwPTS in the special subframe occupies P time-domain symbols and the UpPTS in the special subframe occupies N time-domain symbol, where P is an integer, $P+N \leq 13$ and $P \geq 1$.

Optionally, the second special subframe configuration is one of a plurality of special subframe configurations satisfying a condition that: when a normal CP is used in downlink, the DwPTS in the special subframe occupies P time-domain symbols and the UpPTS in the special subframe occupies N time-domain symbol, where P is an integer, $P+N \leq 13$ and $6 \leq P \leq 8$, or when a normal CP is used in downlink, the DwPTS in the special subframe occupies P time-domain symbols and the UpPTS in the special subframe occupies N time-domain symbol, where P is an integer, P+N≤13 and 1≤P≤5.

Optionally, the second special subframe configuration is determined based on the first signaling message and the second signaling message by:

determining, by the base station and the UE, the first special subframe configuration based on the first signaling message, so as to obtain a number of time-domain symbols occupied by a Downlink Pilot Time Slot (DwPTS) or a number of time-domain symbols occupied by a Guard Period (GP) in the first special subframe configuration; and determining, by the base station and the UE, a number of time-domain symbols occupied by an Uplink Pilot Time Slot (UpPTS) in the second special subframe configuration based on the second signaling message, and determining, by the base station and the UE, a number of time-domain symbols occupied by a DwPTS or a number of time-domain symbols occupied by a GP in the second special subframe configuration, based on the number of time-domain symbols occupied by the DwPTS in the first special subframe configuration; or determining, by the base station and the UE, the number of time-domain symbols occupied by the UpPTS in the second special subframe configuration based on the second signaling message, and determining, by the base station and the UE, the number of time-domain symbols occupied by the DwPTS or the number of time-domain symbols occupied by the GP in the second special subframe configuration, based on the number of time-domain symbols occupied by the GP in the first special subframe configuration.

Optionally, the operation of determining the number of time-domain symbols occupied by the DwPTS or the number of time-domain symbols occupied by the GP in the second special subframe configuration based on the number of time-domain symbols occupied by the DwPTS in the first special subframe configuration includes:

determining the number of time-domain symbols occupied by the DwPTS in the second special subframe configuration to be equal to the number of time-domain symbols occupied by the DwPTS in the first special subframe configuration, or determining the number of time-domain symbols occupied by the GP in the second special subframe configuration to be equal to (14−the number of time-domain symbols occupied by the UpPTS in the second special subframe configuration−the number of time-domain symbols occupied by the DwPTS in the first special subframe configuration).

Optionally, the operation of determining the number of time-domain symbols occupied by the DwPTS or the number of time-domain symbols occupied by the GP in the second special subframe configuration based on the number of time-domain symbols occupied by the GP in the first special subframe configuration includes:

determining the number of time-domain symbols occupied by the DwPTS in the second special subframe configuration to be equal to (14−the number of time-domain symbols occupied by the UpPTS in the second special subframe configuration−the number of time-domain symbols occupied by the GP in the first special subframe configuration), or determining the number of time-domain symbols occupied by the GP in the second special subframe configuration to be equal to the number of time-domain symbols occupied by the GP in the first special subframe configuration.

Optionally, when the second signaling message is a System Information Block (SIB) broadcast signaling message and the SIB broadcast signaling message is configured by the base station or configured by the base station to be valid, the second signaling message indicates at least one of: a number of time-domain symbols occupied by an Uplink Pilot Time Slot (UpPTS) in a special subframe for the UE is larger than 3; a number of time-domain symbols occupied by a Downlink Pilot Time Slot (DwPTS) in the special subframe for the UE equals to a number of time-domain symbols occupied by a DwPTS indicated in the first special subframe configuration; or a number of time-domain symbols occupied by a Guard Period (GP) in the special subframe for the UE equals to a number of time-domain symbols occupied by a GP indicated in the first special subframe configuration. Alternatively, when the second signaling message is a Radio Resource Control (RRC) signaling message, the second signaling message indicates at least one of: the number of time-domain symbols occupied by the UpPTS in the special subframe for the UE equals to 1 or 2; the number of time-domain symbols occupied by the UpPTS in the special subframe for the UE is larger than 3 and the number of time-domain symbols occupied by the DwPTS in the special subframe for the UE equals to the number of time-domain symbols occupied by the DwPTS indicated in the first special subframe configuration; or the number of time-domain symbols occupied by the UpPTS in the special subframe for the UE is larger than 3 and the number of time-domain symbols occupied by the GP in the special subframe for the UE equals to the number of time-domain symbols occupied by the GP indicated in the first special subframe configuration.

In a third aspect of the embodiments of the present disclosure, an apparatus applied in a base station for signaling configuration is provided. The apparatus includes: a transmitting module configured to signal a first special subframe configuration and a second special subframe configuration to a User Equipment (UE) via a first signaling message and a second signaling message. The first special subframe configuration is determined by the base station and the UE based on the first signaling message, and the second special subframe configuration is determined by the base station and the UE based on the first signaling message and the second signaling message or based on the second signaling message.

Optionally, the transmitting module is configured to select the first special subframe configuration and the second special subframe configuration from a set of special subframe configurations, and transmit the first special subframe configuration and the second special subframe configuration to the UE via the first signaling message and the second signaling message, respectively. The first signaling message and the second signaling message are each a broadcast signaling message carried in a System Information Block (SIB) for indicating special subframe configuration. Alternatively, the transmitting module is configured to select the first special subframe configuration from the set of special subframe configurations, transmit the first special subframe configuration to the UE via the first signaling message, and indicate the second special subframe configuration to the UE via the second signaling message. The first signaling message is a broadcast signaling message carried in a SIB for indicating the first special subframe configuration, and the second signaling message is a broadcast signaling message carried in a SIB or in a UE-specific Radio Resource Control (RRC) signaling message for indicating the second special subframe configuration. A special subframe indicated in the first special subframe configuration contains M time-domain symbols for Sounding Reference Signal (SRS) transmission or M Uplink Pilot Time Slot (UpPTS) symbols, where M is an integer and 1≤M≤2. A special subframe indicated in the second special subframe configuration contains N time-domain symbols for SRS transmission or N UpPTS symbols, where N is an integer and 3≤N≤10.

Optionally, the first special subframe configuration is a normal special subframe configuration and the second special subframe configuration is an extended special subframe configuration.

Optionally, the first special subframe configuration includes one of:

Special Subframe Configuration 0: when a normal Cyclic Prefix (CP) is used in downlink, a Downlink Pilot Time Slot (DwPTS) in the special subframe occupies 3 time-domain symbols and the UpPTS in the special subframe occupies 1 time-domain symbol;

Special Subframe Configuration 1: when a normal CP is used in downlink, the DwPTS in the special subframe occupies 9 time-domain symbols and the UpPTS in the special subframe occupies 1 time-domain symbol;

Special Subframe Configuration 2: when a normal CP is used in downlink, the DwPTS in the special subframe occupies 10 time-domain symbols and the UpPTS in the special subframe occupies 1 time-domain symbol;

Special Subframe Configuration 3: when a normal CP is used in downlink, the DwPTS in the special subframe occupies 11 time-domain symbols and the UpPTS in the special subframe occupies 1 time-domain symbol;

Special Subframe Configuration 4: when a normal CP is used in downlink, the DwPTS in the special subframe occupies 12 time-domain symbols and the UpPTS in the special subframe occupies 1 time-domain symbol;

Special Subframe Configuration 5: when a normal CP is used in downlink, the DwPTS in the special subframe occupies 3 time-domain symbols and the UpPTS in the special subframe occupies 2 time-domain symbols;

Special Subframe Configuration 6: when a normal CP is used in downlink, the DwPTS in the special subframe occupies 9 time-domain symbols and the UpPTS in the special subframe occupies 2 time-domain symbols;

Special Subframe Configuration 7: when a normal CP is used in downlink, the DwPTS in the special subframe occupies 10 time-domain symbols and the UpPTS in the special subframe occupies 2 time-domain symbols;

Special Subframe Configuration 8: when a normal CP is used in downlink, the DwPTS in the special subframe occupies 11 time-domain symbols and the UpPTS in the special subframe occupies 2 time-domain symbols; or Special Subframe Configuration 9: when a normal CP is used in downlink, the DwPTS in the special subframe occupies 6 time-domain symbols and the UpPTS in the special subframe occupies 2 time-domain symbols.

Optionally, the second special subframe configuration is one of a plurality of special subframe configurations satisfying a condition that: when a normal CP is used in downlink, the DwPTS in the special subframe occupies P time-domain symbols and the UpPTS in the special subframe occupies N time-domain symbol, where P is an integer, P+N≤13 and P≥1.

Optionally, the second special subframe configuration is one of a plurality of special subframe configurations satisfying a condition that: when a normal CP is used in downlink, the DwPTS in the special subframe occupies P time-domain symbols and the UpPTS in the special subframe occupies N time-domain symbol, where P is an integer, P+N≤13 and 6≤P≤8, or when a normal CP is used in downlink, the DwPTS in the special subframe occupies P time-domain symbols and the UpPTS in the special subframe occupies N time-domain symbol, where P is an integer, P+N≤13 and 1≤P≤5.

Optionally, the apparatus further includes a determining module configured to:

determine the first special subframe configuration based on the first signaling message, so as to obtain a number of time-domain symbols occupied by a Downlink Pilot Time Slot (DwPTS) or a number of time-domain symbols occupied by a Guard Period (GP) in the first special subframe configuration; and determine a number of time-domain symbols occupied by an Uplink Pilot Time Slot (UpPTS) in the second special subframe configuration based on the second signaling message, and determine a number of time-domain symbols occupied by a DwPTS or a number of time-domain symbols occupied by a GP in the second special subframe configuration, based on the number of time-domain symbols occupied by the DwPTS in the first special subframe configuration; or determine the number of time-domain symbols occupied by the UpPTS in the second special subframe configuration based on the second signaling message, and determine the number of time-domain symbols occupied by the DwPTS or the number of time-domain symbols occupied by the GP in the second special subframe configuration, based on the number of time-domain symbols occupied by the GP in the first special subframe configuration.

Optionally, the determining module is configured to determine the number of time-domain symbols occupied by the DwPTS or the number of time-domain symbols occupied by the GP in the second special subframe configuration based on the number of time-domain symbols occupied by the DwPTS in the first special subframe configuration by:

determining the number of time-domain symbols occupied by the DwPTS in the second special subframe configuration to be equal to the number of time-domain symbols occupied by the DwPTS in the first special subframe configuration, or determining the number of time-domain symbols occupied by the GP in the second special subframe configuration to be equal to (14−the number of time-domain symbols occupied by the UpPTS in the second special subframe configuration−the number of time-domain symbols occupied by the DwPTS in the first special subframe configuration).

Optionally, the determining module is configured to determine the number of time-domain symbols occupied by the DwPTS or the number of time-domain symbols occupied by the GP in the second special subframe configuration based on the number of time-domain symbols occupied by the GP in the first special subframe configuration by:

determining the number of time-domain symbols occupied by the DwPTS in the second special subframe configuration to be equal to (14−the number of time-domain symbols occupied by the UpPTS in the second special subframe configuration−the number of time-domain symbols occupied by the GP in the first special subframe configuration), or determining the number of time-domain symbols occupied by the GP in the second special subframe configuration to be equal to the number of time-domain symbols occupied by the GP in the first special subframe configuration.

Optionally, when the second signaling message is a System Information Block (SIB) broadcast signaling message and the SIB broadcast signaling message is configured by the base station or configured by the base station to be valid, the second signaling message indicates at least one of: a number of time-domain symbols occupied by an Uplink Pilot Time Slot (UpPTS) in a special subframe for the UE is larger than 3; a number of time-domain symbols occupied by a Downlink Pilot Time Slot (DwPTS) in the special subframe for the UE equals to a number of time-domain symbols occupied by a DwPTS indicated in the first special subframe configuration; or a number of time-domain symbols occupied by a Guard Period (GP) in the special subframe for the UE equals to a number of time-domain symbols occupied by a GP indicated in the first special subframe configuration. Alternatively, when the second signaling message is a Radio Resource Control (RRC) signaling message, the second signaling message indicates at least one of: the number of time-domain symbols occupied by the UpPTS in the special subframe for the UE equals to 1 or 2; the number of time-domain symbols occupied by the UpPTS in the special subframe for the UE is larger than 3 and the number of time-domain symbols occupied by the DwPTS in the special subframe for the UE equals to the number of time-domain symbols occupied by the DwPTS indicated in the first special subframe configuration; or the number of time-domain symbols occupied by the UpPTS in the special subframe for the UE is larger than 3 and the number of time-domain symbols occupied by the GP in the special subframe for the UE equals to the number of time-domain symbols occupied by the GP indicated in the first special subframe configuration.

In a fourth aspect of the embodiments of the present disclosure, an apparatus applied in a User Equipment (UE) for signaling configuration is provided. The apparatus includes: a receiving module configured to receive a first special subframe configuration and a second special subframe configuration via a first signaling message and a second signaling message transmitted from a base station. The first special subframe configuration is determined by the base station and the UE based on the first signaling message, and the second special subframe configuration is determined by the base station and the UE based on the first signaling message and the second signaling message or based on the second signaling message.

Optionally, the receiving module is configured to receive the first special subframe configuration via the first signaling message and the second special subframe configuration via the second signaling message. The first signaling message and the second signaling message are each a broadcast signaling message carried in a System Information Block (SIB) for indicating special subframe configuration. Alternatively, the receiving module is configured to receive the first special subframe configuration via the first signaling message, and information indicating the second special subframe configuration via the second signaling message. The first signaling message is a broadcast signaling message carried in a SIB for indicating the first special subframe configuration, and the second signaling message is a broadcast signaling message carried in a SIB or in a UE-specific Radio Resource Control (RRC) signaling message for indicating the second special subframe configuration. A special subframe indicated in the first special subframe configuration contains M time-domain symbols for Sounding Reference Signal (SRS) transmission or M Uplink Pilot Time Slot (UpPTS) symbols, where M is an integer and $1 \leq M \leq 2$. A special subframe indicated in the second special subframe configuration contains N time-domain symbols for SRS transmission or N UpPTS symbols, where N is an integer and $3 \leq N \leq 10$.

Optionally, the first special subframe configuration is a normal special subframe configuration and the second special subframe configuration is an extended special subframe configuration.

Optionally, the first special subframe configuration includes one of:

Special Subframe Configuration 0: when a normal Cyclic Prefix (CP) is used in downlink, a Downlink Pilot Time Slot (DwPTS) in the special subframe occupies 3 time-domain symbols and the UpPTS in the special subframe occupies 1 time-domain symbol;

Special Subframe Configuration 1: when a normal CP is used in downlink, the DwPTS in the special subframe occupies 9 time-domain symbols and the UpPTS in the special subframe occupies 1 time-domain symbol;

Special Subframe Configuration 2: when a normal CP is used in downlink, the DwPTS in the special subframe occupies 10 time-domain symbols and the UpPTS in the special subframe occupies 1 time-domain symbol;

Special Subframe Configuration 3: when a normal CP is used in downlink, the DwPTS in the special subframe occupies 11 time-domain symbols and the UpPTS in the special subframe occupies 1 time-domain symbol;

Special Subframe Configuration 4: when a normal CP is used in downlink, the DwPTS in the special subframe occupies 12 time-domain symbols and the UpPTS in the special subframe occupies 1 time-domain symbol;

Special Subframe Configuration 5: when a normal CP is used in downlink, the DwPTS in the special subframe occupies 3 time-domain symbols and the UpPTS in the special subframe occupies 2 time-domain symbols;

Special Subframe Configuration 6: when a normal CP is used in downlink, the DwPTS in the special subframe occupies 9 time-domain symbols and the UpPTS in the special subframe occupies 2 time-domain symbols;

Special Subframe Configuration 7: when a normal CP is used in downlink, the DwPTS in the special subframe occupies 10 time-domain symbols and the UpPTS in the special subframe occupies 2 time-domain symbols;

Special Subframe Configuration 8: when a normal CP is used in downlink, the DwPTS in the special subframe occupies 11 time-domain symbols and the UpPTS in the special subframe occupies 2 time-domain symbols; or Special Subframe Configuration 9: when a normal CP is used in downlink, the DwPTS in the special subframe occupies 6 time-domain symbols and the UpPTS in the special subframe occupies 2 time-domain symbols.

Optionally, the second special subframe configuration is one of a plurality of special subframe configurations satisfying a condition that: when a normal CP is used in downlink, the DwPTS in the special subframe occupies P time-domain symbols and the UpPTS in the special subframe occupies N time-domain symbol, where P is an integer, $P+N \leq 13$ and $P \geq 1$.

Optionally, the second special subframe configuration is one of a plurality of special subframe configurations satisfying a condition that: when a normal CP is used in downlink, the DwPTS in the special subframe occupies P time-domain symbols and the UpPTS in the special subframe occupies N time-domain symbol, where P is an integer, $P+N \leq 13$ and $6 \leq P \leq 8$, or when a normal CP is used in downlink, the DwPTS in the special subframe occupies P time-domain symbols and the UpPTS in the special subframe occupies N time-domain symbol, where P is an integer, $P+N \leq 13$ and $1 \leq P \leq 5$.

Optionally, the apparatus further includes a determining module configured to:

determine the first special subframe configuration based on the first signaling message, so as to obtain a number of time-domain symbols occupied by a Downlink Pilot Time Slot (DwPTS) or a number of time-domain symbols occupied by a Guard Period (GP) in the first special subframe configuration; and determine a number of time-domain symbols occupied by an Uplink Pilot Time Slot (UpPTS) in the second special subframe configuration based on the second signaling message, and determine a number of time-domain symbols occupied by a DwPTS or a number of time-domain symbols occupied by a GP in the second special subframe configuration, based on the number of time-domain symbols occupied by the DwPTS in the first special subframe configuration; or determine the number of time-domain symbols occupied by the UpPTS in the second special subframe configuration based on the second signaling message, and determine the number of time-domain symbols occupied by the DwPTS or the number of time-domain symbols occupied by the GP in the second special subframe configuration, based on the number of time-domain symbols occupied by the GP in the first special subframe configuration.

Optionally, the determining module is configured to determine the number of time-domain symbols occupied by the DwPTS or the number of time-domain symbols occupied by the GP in the second special subframe configuration based on the number of time-domain symbols occupied by the DwPTS in the first special subframe configuration by:

determining the number of time-domain symbols occupied by the DwPTS in the second special subframe configuration to be equal to the number of time-domain symbols occupied by the DwPTS in the first special subframe configuration, or determining the number of time-domain symbols occupied by the GP in the second special subframe configuration to be equal to (14−the number of time-domain symbols occupied by the UpPTS in the second special subframe configuration−the number of time-domain symbols occupied by the DwPTS in the first special subframe configuration).

Optionally, the determining module is configured to determine the number of time-domain symbols occupied by the DwPTS or the number of time-domain symbols occupied by the GP in the second special subframe configuration based on the number of time-domain symbols occupied by the GP in the first special subframe configuration by:

determining the number of time-domain symbols occupied by the DwPTS in the second special subframe configuration to be equal to (14−the number of time-domain symbols occupied by the UpPTS in the second special subframe configuration−the number of time-domain symbols occupied by the GP in the first special subframe configuration), or determining the number of time-domain symbols occupied by the GP in the second special subframe configuration to be equal to the number of time-domain symbols occupied by the GP in the first special subframe configuration.

Optionally, when the second signaling message is a System Information Block (SIB) broadcast signaling message and the SIB broadcast signaling message is configured by the base station or configured by the base station to be valid, the second signaling message indicates at least one of: a number of time-domain symbols occupied by an Uplink Pilot Time Slot (UpPTS) in a special subframe for the UE is larger than 3; a number of time-domain symbols occupied by a Downlink Pilot Time Slot (DwPTS) in the special subframe for the UE equals to a number of time-domain symbols occupied by a DwPTS indicated in the first special subframe configuration; or a number of time-domain symbols occupied by a Guard Period (GP) in the special subframe for the UE equals to a number of time-domain symbols occupied by a GP indicated in the first special subframe configuration. Alternatively, when the second signaling message is a Radio Resource Control (RRC) signaling message, the second signaling message indicates at least one of: the number of time-domain symbols occupied by the UpPTS in the special subframe for the UE equals to 1 or 2; the number of time-domain symbols occupied by the UpPTS in the special subframe for the UE is larger than 3 and the number of time-domain symbols occupied by the DwPTS in the special subframe for the UE equals to the number of time-domain symbols occupied by the DwPTS indicated in the first special subframe configuration; or the number of time-domain symbols occupied by the UpPTS in the special subframe for the UE is larger than 3 and the number of time-domain symbols occupied by the GP in the special subframe for the UE equals to the number of time-domain symbols occupied by the GP indicated in the first special subframe configuration.

In a fifth aspect of the embodiments of the present disclosure, a method for signaling configuration is provided. The method includes: transmitting, by a base station, a special subframe configuration to a User Equipment (UE). The special subframe configuration indicates at least that an Uplink Pilot Time Slot (UpPTS) occupies N time-domain symbols in a special subframe, where N is an integer and $3 \leq N \leq 10$.

Optionally, the base station transmitting the special subframe configuration to the UE includes: selecting, by the base station, a first special subframe configuration and a second special subframe configuration from a set of special subframe configurations, and transmitting the special subframe configuration including the first special subframe configuration and the second special subframe configuration to the UE, or selecting, by the base station, the second special subframe configuration from the set of special subframe configurations, and transmitting the special subframe configuration including the second special subframe configuration to the UE. The first special subframe configuration indicates at least that the UpPTS occupies M time-domain symbols in the special subframe, where M is an integer and $1 \leq M \leq 2$. The second special subframe configuration indicates at least that the UpPTS occupies N time-domain symbols in the special subframe, where N is an integer and $3 \leq N \leq 10$.

Optionally, the first special subframe configuration is a normal special subframe configuration and the second special subframe configuration is an extended special subframe configuration.

Optionally, the first special subframe configuration includes one of:

Special Subframe Configuration 0: when a normal Cyclic Prefix (CP) is used in downlink, a Downlink Pilot Time Slot (DwPTS) in the special subframe occupies 3 time-domain symbols and the UpPTS in the special subframe occupies 1 time-domain symbol;

Special Subframe Configuration 1: when a normal CP is used in downlink, the DwPTS in the special subframe occupies 9 time-domain symbols and the UpPTS in the special subframe occupies 1 time-domain symbol;

Special Subframe Configuration 2: when a normal CP is used in downlink, the DwPTS in the special subframe occupies 10 time-domain symbols and the UpPTS in the special subframe occupies 1 time-domain symbol;

Special Subframe Configuration 3: when a normal CP is used in downlink, the DwPTS in the special subframe occupies 11 time-domain symbols and the UpPTS in the special subframe occupies 1 time-domain symbol;

Special Subframe Configuration 4: when a normal CP is used in downlink, the DwPTS in the special subframe occupies 12 time-domain symbols and the UpPTS in the special subframe occupies 1 time-domain symbol;

Special Subframe Configuration 5: when a normal CP is used in downlink, the DwPTS in the special subframe occupies 3 time-domain symbols and the UpPTS in the special subframe occupies 2 time-domain symbols;

Special Subframe Configuration 6: when a normal CP is used in downlink, the DwPTS in the special subframe occupies 9 time-domain symbols and the UpPTS in the special subframe occupies 2 time-domain symbols;

Special Subframe Configuration 7: when a normal CP is used in downlink, the DwPTS in the special subframe occupies 10 time-domain symbols and the UpPTS in the special subframe occupies 2 time-domain symbols;

Special Subframe Configuration 8: when a normal CP is used in downlink, the DwPTS in the special subframe occupies 11 time-domain symbols and the UpPTS in the special subframe occupies 2 time-domain symbols; or Special Subframe Configuration 9: when a normal CP is used in downlink, the DwPTS in the special subframe occupies 6 time-domain symbols and the UpPTS in the special subframe occupies 2 time-domain symbols.

Optionally, the second special subframe configuration includes: Special Subframe Configuration 10: when a normal CP is used in downlink, a Downlink Pilot Time Slot (DwPTS) in the special subframe occupies P time-domain symbols and the UpPTS in the special subframe occupies N time-domain symbol, where P is an integer, $P+N \leq 13$ and $P \geq 1$.

Optionally, the method further includes, subsequent to selecting the first special subframe configuration, one of:

determining, by the base station, a number of time-domain symbols occupied by a Downlink Pilot Time Slot (DwPTS) in the special subframe as indicated in the second special subframe configuration, based on a number of time-domain symbols occupied by the DwPTS in the special subframe as indicated in the first special subframe configuration;

determining, by the base station, a number of time-domain symbols occupied by a Guard Period (GP) in the special subframe as indicated in the second special subframe configuration, based on the number of time-domain symbols occupied by the DwPTS in the special subframe as indicated in the first special subframe configuration and the number of time-domain symbols occupied by the UpPTS in the special subframe as indicated in the second special subframe configuration;

determining, by the base station, the number of time-domain symbols occupied by the GP in the special subframe as indicated in the second special subframe configuration, based on the number of time-domain symbols occupied by the GP in the special subframe as indicated in the first special subframe configuration; or determining, by the base station, the number of time-domain symbols occupied by the DwPTS in the special subframe as indicated in the second special subframe configuration, based on the number of time-domain symbols occupied by the GP in the special subframe as indicated in the first special subframe configuration and the number of time-domain symbols occupied by the UpPTS in the special subframe as indicated in the second special subframe configuration.

Optionally, the base station determining the number of time-domain symbols occupied by the DwPTS in the special subframe as indicated in the second special subframe configuration based on the number of time-domain symbols occupied by the DwPTS in the special subframe as indicated in the first special subframe configuration includes: determining, by the base station, when the first special subframe configuration indicates that the DwPTS in the special subframe occupies P time-domain symbols, that the number of time-domain symbols occupied by the DwPTS in the special subframe as indicated in the second special subframe configuration is P, where P is an integer and $P \geq 1$. The base station determining the number of time-domain symbols occupied by the GP in the special subframe as indicated in the second special subframe configuration based on the number of time-domain symbols occupied by the DwPTS in the special subframe as indicated in the first special subframe configuration and the number of time-domain symbols occupied by the UpPTS in the special subframe as indicated in the second special subframe configuration includes: determining, by the base station, when the first special subframe configuration indicates that the DwPTS in the special subframe occupies P time-domain symbols, that the number of time-domain symbols occupied by the GP in the special subframe as indicated in the second special subframe configuration is 14−N−P, where P is an integer, $P \geq 1$ and $14-N-P \geq 1$. The base station determining the number of time-domain symbols occupied by the GP in the special subframe as indicated in the second special subframe configuration based on the number of time-domain symbols occupied by the GP in the special subframe as indicated in the first special subframe configuration includes: determining, by the base station, when the first special subframe configuration indicates that the GP in the special subframe occupies Q time-domain symbols, that the number of time-domain symbols occupied by the GP in the special subframe as indicated in the second special subframe configuration is Q, where Q is an integer and $Q \geq 1$. The base station determining the number of time-domain symbols occupied by the DwPTS in the special subframe as indicated in the second special subframe configuration, based on the number of time-domain symbols occupied by the GP in the special subframe as indicated in the first special subframe configuration and the number of time-domain symbols occupied by the UpPTS in the special subframe as indicated in the second special subframe configuration includes: determining, by the base station, when the first special subframe configuration indicates that the GP in the special subframe occupies Q time-domain symbols, that the number of time-domain symbols occupied by the DwPTS in the special subframe as indicated in the second special subframe configuration is 14−N−Q, where Q is an integer, $Q \geq 1$ and $14-N-Q \geq 1$.

Optionally, the base station transmitting the special subframe configuration to the UE includes: transmitting, by the base station, the first special subframe configuration to the UE via a System Information Block (SIB) broadcast signaling message; and/or transmitting, by the base station, the second special subframe configuration to the UE via a predetermined signaling message. The predetermined signaling message includes one of a SIB broadcast signaling message or a higher layer Radio Resource Control (RRC) signaling message.

In a sixth aspect of the embodiments of the present disclosure, a method for signaling configuration is provided.

The method includes: transmitting, by a base station, a predetermined signaling message to a User Equipment (UE). The predetermined signaling message is for updating at least one of: a number of time-domain symbols, among time-domain symbols occupied by a Guard Period (GP) in a special subframe, that are available for Sounding Reference Signal (SRS) transmission; or a number of time-domain symbols occupied by an Uplink Pilot Time Slot (UpPTS) to be added in the special subframe.

Optionally, the method further includes, prior to the base station transmitting the predetermined signaling message to the UE: transmitting, by the base station, a special subframe configuration to the UE, for indicating a number of time-domain symbols occupied by a Downlink Pilot Time Slot (DwPTS), a number of time-domain symbols occupied by the GP and a number of time-domain symbols occupied by the UpPTS in the special subframe before the updating.

Optionally, the method further includes, subsequent to the base station transmitting the special subframe configuration to the UE: determining, by the base station, a number of time-domain symbols occupied by the DwPTS, a number of time-domain symbols occupied by the GP and a number of time-domain symbols occupied by the UpPTS in the special subframe after the updating, based on the special subframe configuration and the predetermined signaling message.

Optionally, when the predetermined signaling message is for updating only the number of time-domain symbols, among the time-domain symbols occupied by the GP in the special subframe, that are available for SRS transmission, the base station determining the number of time-domain symbols occupied by the DwPTS, the number of time-domain symbols occupied by the GP and the number of time-domain symbols occupied by the UpPTS in the special subframe after the updating based on the special subframe configuration and the predetermined signaling message includes: determining, by the base station, the number of time-domain symbols occupied by the DwPTS, the number of time-domain symbols occupied by the GP and the number of time-domain symbols occupied by the UpPTS in the special subframe after the updating to be the same as those before the updating.

Optionally, when the predetermined signaling message is for updating at least the number of time-domain symbols occupied by the UpPTS to be added in the special subframe, the base station determining the number of time-domain symbols occupied by the DwPTS, the number of time-domain symbols occupied by the GP and the number of time-domain symbols occupied by the UpPTS in the special subframe after the updating based on the special subframe configuration and the predetermined signaling message includes one of: determining, by the base station, the number of time-domain symbols occupied by the DwPTS in the special subframe after the updating to be the same as that before the updating; or determining, by the base station, the number of time-domain symbols occupied by the GP in the special subframe after the updating to be the same as that before the updating.

Optionally, the method further includes, prior to the base station transmitting the predetermined signaling message to the UE: determining, by the base station, the number of time-domain symbols, among the time-domain symbols occupied by the GP in the special subframe, that are available for SRS transmission after the updating and/or the number of time-domain symbols occupied by the UpPTS to be added in the special subframe after the updating, based on at least one of: a radius of a cell in which the UE is located, a number of active UEs in the cell in which the UE is located, or a special subframe configuration of the special subframe before the updating.

Optionally, the SRS includes at least one of a periodic SRS and an aperiodic SRS.

In a seventh aspect of the present disclosure, a method for signaling configuration is provided. The method includes: receiving, by a User Equipment (UE), a special subframe configuration. The special subframe configuration indicates at least that an Uplink Pilot Time Slot (UpPTS) occupies N time-domain symbols in a special subframe, where N is an integer and $3 \leq N \leq 10$.

Optionally, the UE receiving the special subframe configuration includes: receiving, by the UE, a first special subframe configuration and a second special subframe configuration, or receiving, by the UE, the second special subframe configuration. The first special subframe configuration indicates at least that the UpPTS occupies M time-domain symbols in the special subframe, where M is an integer and $1 \leq M \leq 2$. The second special subframe configuration indicates at least that the UpPTS occupies N time-domain symbols in the special subframe, where N is an integer and $3 \leq N \leq 10$.

Optionally, the first special subframe configuration is a normal special subframe configuration and the second special subframe configuration is an extended special subframe configuration.

Optionally, the first special subframe configuration includes one of:

Special Subframe Configuration 0: when a normal Cyclic Prefix (CP) is used in downlink, a Downlink Pilot Time Slot (DwPTS) in the special subframe occupies 3 time-domain symbols and the UpPTS in the special subframe occupies 1 time-domain symbol;

Special Subframe Configuration 1: when a normal CP is used in downlink, the DwPTS in the special subframe occupies 9 time-domain symbols and the UpPTS in the special subframe occupies 1 time-domain symbol;

Special Subframe Configuration 2: when a normal CP is used in downlink, the DwPTS in the special subframe occupies 10 time-domain symbols and the UpPTS in the special subframe occupies 1 time-domain symbol;

Special Subframe Configuration 3: when a normal CP is used in downlink, the DwPTS in the special subframe occupies 11 time-domain symbols and the UpPTS in the special subframe occupies 1 time-domain symbol;

Special Subframe Configuration 4: when a normal CP is used in downlink, the DwPTS in the special subframe occupies 12 time-domain symbols and the UpPTS in the special subframe occupies 1 time-domain symbol;

Special Subframe Configuration 5: when a normal CP is used in downlink, the DwPTS in the special subframe occupies 3 time-domain symbols and the UpPTS in the special subframe occupies 2 time-domain symbols;

Special Subframe Configuration 6: when a normal CP is used in downlink, the DwPTS in the special subframe occupies 9 time-domain symbols and the UpPTS in the special subframe occupies 2 time-domain symbols;

Special Subframe Configuration 7: when a normal CP is used in downlink, the DwPTS in the special subframe occupies 10 time-domain symbols and the UpPTS in the special subframe occupies 2 time-domain symbols;

Special Subframe Configuration 8: when a normal CP is used in downlink, the DwPTS in the special subframe occupies 11 time-domain symbols and the UpPTS in the special subframe occupies 2 time-domain symbols; or Special Subframe Configuration 9: when a normal CP is used in downlink, the DwPTS in the special subframe occupies 6 time-domain symbols and the UpPTS in the special subframe occupies 2 time-domain symbols.

Optionally, the second special subframe configuration includes: Special Subframe Configuration 10: when a normal CP is used in downlink, a Downlink Pilot Time Slot (DwPTS) in the special subframe occupies P time-domain symbols and the UpPTS in the special subframe occupies N time-domain symbol, where P is an integer, P+N≤13 and P≥1.

Optionally, the method further includes, subsequent to the UE receiving the special subframe configuration, one of:

determining, by the UE, a number of time-domain symbols occupied by a Downlink Pilot Time Slot (DwPTS) in the special subframe as indicated in the second special subframe configuration, based on a number of time-domain symbols occupied by the DwPTS in the special subframe as indicated in the first special subframe configuration;

determining, by the UE, a number of time-domain symbols occupied by a Guard Period (GP) in the special subframe as indicated in the second special subframe configuration, based on the number of time-domain symbols occupied by the DwPTS in the special subframe as indicated in the first special subframe configuration and the number of time-domain symbols occupied by the UpPTS in the special subframe as indicated in the second special subframe configuration;

determining, by the UE, the number of time-domain symbols occupied by the GP in the special subframe as indicated in the second special subframe configuration, based on the number of time-domain symbols occupied by the GP in the special subframe as indicated in the first special subframe configuration; or determining, by the UE, the number of time-domain symbols occupied by the DwPTS in the special subframe as indicated in the second special subframe configuration, based on the number of time-domain symbols occupied by the GP in the special subframe as indicated in the first special subframe configuration and the number of time-domain symbols occupied by the UpPTS in the special subframe as indicated in the second special subframe configuration.

Optionally, the UE determining the number of time-domain symbols occupied by the DwPTS in the special subframe as indicated in the second special subframe configuration based on the number of time-domain symbols occupied by the DwPTS in the special subframe as indicated in the first special subframe configuration includes: determining, by the UE, when the first special subframe configuration indicates that the DwPTS in the special subframe occupies P time-domain symbols, that the number of time-domain symbols occupied by the DwPTS in the special subframe as indicated in the second special subframe configuration is P, where P is an integer and P≥1. The UE determining the number of time-domain symbols occupied by the GP in the special subframe as indicated in the second special subframe configuration based on the number of time-domain symbols occupied by the DwPTS in the special subframe as indicated in the first special subframe configuration and the number of time-domain symbols occupied by the UpPTS in the special subframe as indicated in the second special subframe configuration includes: determining, by the UE, when the first special subframe configuration indicates that the DwPTS in the special subframe occupies P time-domain symbols, that the number of time-domain symbols occupied by the GP in the special subframe as indicated in the second special subframe configuration is 14−N−P, where P is an integer, P≥1 and 14−N−P≥1. The UE determining the number of time-domain symbols occupied by the GP in the special subframe as indicated in the second special subframe configuration based on the number of time-domain symbols occupied by the GP in the special subframe as indicated in the first special subframe configuration includes: determining, by the UE, when the first special subframe configuration indicates that the GP in the special subframe occupies Q time-domain symbols, that the number of time-domain symbols occupied by the GP in the special subframe as indicated in the second special subframe configuration is Q, where Q is an integer and Q≥1. The UE determining the number of time-domain symbols occupied by the DwPTS in the special subframe as indicated in the second special subframe configuration, based on the number of time-domain symbols occupied by the GP in the special subframe as indicated in the first special subframe configuration and the number of time-domain symbols occupied by the UpPTS in the special subframe as indicated in the second special subframe configuration includes: determining, by the UE, when the first special subframe configuration indicates that the GP in the special subframe occupies Q time-domain symbols, that the number of time-domain symbols occupied by the DwPTS in the special subframe as indicated in the second special subframe configuration is 14−N−Q, where Q is an integer, Q≥1 and 14−N−Q≥1.

Optionally, the UE receiving the special subframe configuration includes: receiving, by the UE, the first special subframe configuration via a System Information Block (SIB) broadcast signaling message; and/or receiving, by the UE, the second special subframe configuration via a predetermined signaling message. The predetermined signaling message includes one of a SIB broadcast signaling message or a higher layer Radio Resource Control (RRC) signaling message.

In an eighth embodiment of the present disclosure, a method for signaling configuration is provided. The method includes: receiving, by a User Equipment (UE), a predetermined signaling message. The predetermined signaling message is for updating at least one of: a number of time-domain symbols, among time-domain symbols occupied by a Guard Period (GP) in a special subframe, that are available for Sounding Reference Signal (SRS) transmission; or a number of time-domain symbols occupied by an Uplink Pilot Time Slot (UpPTS) to be added in the special subframe.

Optionally, the method further includes, prior to the UE receiving the predetermined signaling message: receiving, by the UE, a special subframe configuration, for indicating a number of time-domain symbols occupied by a Downlink Pilot Time Slot (DwPTS), a number of time-domain symbols occupied by the GP and a number of time-domain symbols occupied by the UpPTS in the special subframe before the updating.

Optionally, the method further includes, subsequent to the UE receiving the predetermined signaling message: determining, by the UE, a number of time-domain symbols occupied by the DwPTS, a number of time-domain symbols occupied by the GP and a number of time-domain symbols occupied by the UpPTS in the special subframe after the updating, based on the special subframe configuration and the predetermined signaling message.

Optionally, when the predetermined signaling message is for updating only the number of time-domain symbols, among the time-domain symbols occupied by the GP in the special subframe, that are available for SRS transmission, the UE determining the number of time-domain symbols occupied by the DwPTS, the number of time-domain symbols occupied by the GP and the number of time-domain symbols occupied by the UpPTS in the special subframe after the updating based on the special subframe configuration and the predetermined signaling message includes: determining, by the UE, the number of time-domain symbols occupied by the DwPTS, the number of time-domain symbols occupied by the GP and the number of time-domain symbols occupied by the UpPTS in the special subframe after the updating to be the same as those before the updating.

Optionally, when the predetermined signaling message is for updating at least the number of time-domain symbols occupied by the UpPTS to be added in the special subframe, the UE determining the number of time-domain symbols occupied by the DwPTS, the number of time-domain symbols occupied by the GP and the number of time-domain symbols occupied by the UpPTS in the special subframe after the updating based on the special subframe configuration and the predetermined signaling message includes one of: determining, by the UE, the number of time-domain symbols occupied by the DwPTS in the special subframe after the updating to be the same as that before the updating; or determining, by the UE, the number of time-domain symbols occupied by the GP in the special subframe after the updating to be the same as that before the updating.

Optionally, the number of time-domain symbols, among the time-domain symbols occupied by the GP in the special subframe, that are available for SRS transmission after the updating and/or the number of time-domain symbols occupied by the UpPTS to be added in the special subframe after the updating is determined based on at least one of: a radius of a cell in which the UE is located, a number of active UEs in the cell in which the UE is located, or a special subframe configuration of the special subframe before the updating.

Optionally, the SRS includes at least one of a periodic SRS and an aperiodic SRS.

In a ninth aspect of the embodiments of the present disclosure, an apparatus applied in a base station for signaling configuration is provided. The apparatus includes: a first transmitting module configured to transmit a special subframe configuration to a User Equipment (UE). The special subframe configuration indicates at least that an Uplink Pilot Time Slot (UpPTS) occupies N time-domain symbols in a special subframe, where N is an integer and $3 \leq N \leq 10$.

In a tenth aspect of the embodiments of the present disclosure, an apparatus applied in a base station for signaling configuration is provided. The apparatus includes: a second transmitting module configured to transmit a predetermined signaling message to a User Equipment (UE). The predetermined signaling message is for updating at least one of: a number of time-domain symbols, among time-domain symbols occupied by a Guard Period (GP) in a special subframe, that are available for Sounding Reference Signal (SRS) transmission; or a number of time-domain symbols occupied by an Uplink Pilot Time Slot (UpPTS) to be added in the special subframe.

In an eleventh aspect of the embodiments of the present disclosure, an apparatus applied in a User Equipment (UE) for signaling configuration is provided. The apparatus includes: a first receiving module configured to receive a special subframe configuration. The special subframe configuration indicates at least that an Uplink Pilot Time Slot (UpPTS) occupies N time-domain symbols in a special subframe, where N is an integer and $3 \leq N \leq 10$.

In a twelfth aspect of the embodiments of the present disclosure, an apparatus applied in a User Equipment (UE) for signaling configuration is provided. The apparatus includes: a second receiving module configured to receive a predetermined signaling message. The predetermined signaling message is for updating at least one of: a number of time-domain symbols, among time-domain symbols occupied by a Guard Period (GP) in a special subframe, that are available for Sounding Reference Signal (SRS) transmission; or a number of time-domain symbols occupied by an Uplink Pilot Time Slot (UpPTS) to be added in the special subframe.

According to an embodiment of the present disclosure, a computer readable storage medium is provided. The computer readable storage medium stores computer executable instructions which, when executed, perform the method for signaling configuration in the above first aspect.

According to an embodiment of the present disclosure, a computer readable storage medium is provided. The computer readable storage medium stores computer executable instructions which, when executed, perform the method for signaling configuration in the above second aspect.

According to an embodiment of the present disclosure, a computer readable storage medium is provided. The computer readable storage medium stores computer executable instructions which, when executed, perform the method for signaling configuration in the above fifth aspect.

According to an embodiment of the present disclosure, a computer readable storage medium is provided. The computer readable storage medium stores computer executable instructions which, when executed, perform the method for signaling configuration in the above sixth aspect.

According to an embodiment of the present disclosure, a computer readable storage medium is provided. The computer readable storage medium stores computer executable instructions which, when executed, perform the method for signaling configuration in the above seventh aspect.

According to an embodiment of the present disclosure, a computer readable storage medium is provided. The computer readable storage medium stores computer executable instructions which, when executed, perform the method for signaling configuration in the above eighth aspect.

With the embodiments of the present disclosure, a base station signals a first special subframe configuration and a second special subframe configuration to a UE via a first signaling message and a second signaling message. The first special subframe configuration is determined by the base station and the UE based on the first signaling message. The second special subframe configuration is determined by the base station and the UE based on the first signaling message and the second signaling message or based on the second signaling message. In this way, the problem associated with low multiplexing capacity of SRSs can be solved and the multiplexing capacity of SRSs can be improved.

Other aspects can be understood from the figures and detailed description.

BRIEF DESCRIPTION OF THE DRAWINGS

The present disclosure can be further understood with reference to the figures described below, which constitute a part of the present disclosure. The illustrative embodiments of the present disclosure and descriptions thereof are provided for explaining, rather than limiting, the present disclosure. In the figures:

FIG. 11 is a fourth schematic diagram showing an apparatus for signaling configuration according to an embodiment of the present disclosure;

FIG. 12 is a fifth schematic diagram showing an apparatus for signaling configuration according to an embodiment of the present disclosure; and FIG. 13 is a sixth schematic diagram showing an apparatus for signaling configuration according to an embodiment of the present disclosure.

DETAILED DESCRIPTION OF THE EMBODIMENTS

Figure 1:
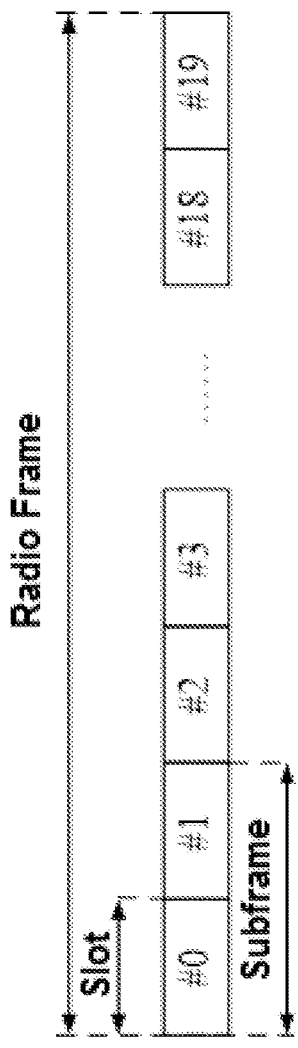
FIG. 1 is a schematic diagram showing a frame structure in the FDD mode in the related art.
Figure 2:
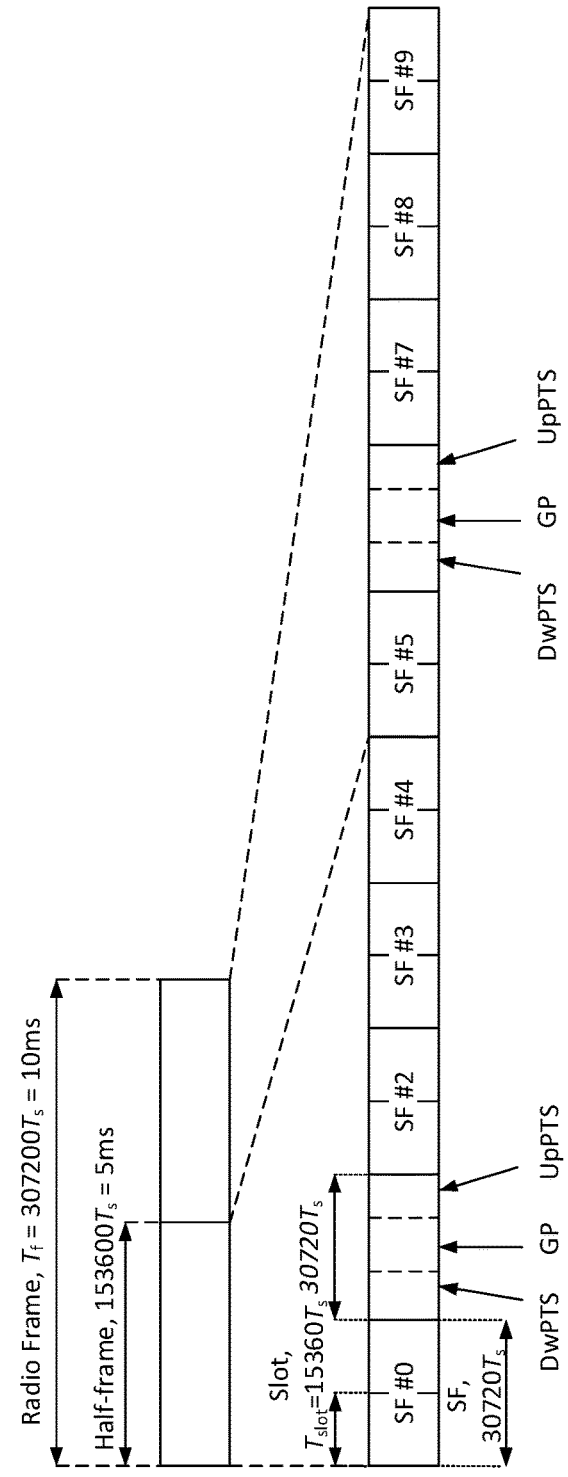
FIG. 2 is a schematic diagram showing a frame structure in the TDD mode in the related art.

In the following, the present disclosure will be described in detail with reference to the figures, taken in conjunction with the embodiments. The embodiments, and the features thereof, can be combined with each other, provided that they do not conflict.

In an embodiment, a method for signaling configuration is provided. The method includes a step of transmitting, by a base station, a special subframe configuration to a User Equipment (UE). The special subframe configuration indicates at least that an UpPTS occupies N time-domain symbols in a special subframe, where N is an integer and $3 \leq N \leq 10$.

With the above step, the base station transmits a special subframe configuration to the UE. The special subframe configuration indicates at least that the number of time-domain symbols occupied by the UpPTS in the special subframe is larger than or equal to 3. When compared with the scheme in the related art where the number of time-domain symbols occupied by the UpPTS is not larger than 2 and accordingly at most two time-domain symbols can be used for SRS transmission, the above step can solve the problem associated with low multiplexing capacity of SRSs and improve the multiplexing capacity of SRSs.

When the base station transmits the special subframe configuration to the UE, the special subframe configuration is selected from a set of special subframe configurations.

A legacy UE may not be able to interpret the special subframe configuration having more than two time-domain symbols occupied by the UpPTS in the special subframe due to limitations of its software version or hardware version. Hence, in order to provide forward compatibility with such legacy UE, when transmitting the special subframe configuration, the base station can select a first special subframe configuration and a second special subframe configuration from the set of special subframe configurations, and transmit the special subframe configuration including the first special subframe configuration and the second special subframe configuration to the UE. Here, the first special subframe configuration indicates at least that the UpPTS occupies M time-domain symbols in the special subframe, where M is an integer and $1 \leq M \leq 2$. The second special subframe configuration indicates at least that the UpPTS occupies N time-domain symbols in the special subframe, where N is an integer and $3 \leq N \leq 10$. In this way, if the UE can interpret the second special subframe configuration, it can determine the number of time-domain symbols occupied by each of the UpPTS, DwPTS and GP in the special subframe based on the second special subframe configuration or based on the special subframe configuration and the first special subframe configuration. If the UE cannot interpret the second special subframe configuration, it can determine the number of time-domain symbols occupied by each portion in the special subframe based on the first special subframe configuration.

If all the UEs can interpret the second special subframe configuration, when transmitting the special subframe configuration to the UE, the base station can select only the second special subframe configuration from the set of special subframe configurations, and transmit the special subframe configuration including the second special subframe configuration to the UE. In this case, the UE can determine the number of time-domain symbols occupied by each of the UpPTS, DwPTS and GP in the special subframe based on the second special subframe configuration directly.

Optionally, the first special subframe configuration can be a normal special subframe configuration and the second special subframe configuration can be an extended special subframe configuration. Here, the normal special subframe configuration refers to a special subframe configuration that has been adopted in the related art and has no more than two time-domain symbols occupied by the UpPTS. The extended special subframe configuration refers to a special subframe configuration that is proposed in the present disclosure and has more than two time-domain symbols occupied by the UpPTS.

Optionally, the first special subframe configuration can include one of:

Special Subframe Configuration 0: when a normal CP is used in downlink, the DwPTS in the special subframe occupies 3 time-domain symbols and the UpPTS in the special subframe occupies 1 time-domain symbol;

Special Subframe Configuration 1: when a normal CP is used in downlink, the DwPTS in the special subframe occupies 9 time-domain symbols and the UpPTS in the special subframe occupies 1 time-domain symbol;

Special Subframe Configuration 2: when a normal CP is used in downlink, the DwPTS in the special subframe occupies 10 time-domain symbols and the UpPTS in the special subframe occupies 1 time-domain symbol;

Special Subframe Configuration 3: when a normal CP is used in downlink, the DwPTS in the special subframe occupies 11 time-domain symbols and the UpPTS in the special subframe occupies 1 time-domain symbol;

Special Subframe Configuration 4: when a normal CP is used in downlink, the DwPTS in the special subframe occupies 12 time-domain symbols and the UpPTS in the special subframe occupies 1 time-domain symbol;

Special Subframe Configuration 5: when a normal CP is used in downlink, the DwPTS in the special subframe occupies 3 time-domain symbols and the UpPTS in the special subframe occupies 2 time-domain symbols;

Special Subframe Configuration 6: when a normal CP is used in downlink, the DwPTS in the special subframe occupies 9 time-domain symbols and the UpPTS in the special subframe occupies 2 time-domain symbols;

Special Subframe Configuration 7: when a normal CP is used in downlink, the DwPTS in the special subframe occupies 10 time-domain symbols and the UpPTS in the special subframe occupies 2 time-domain symbols;

Special Subframe Configuration 8: when a normal CP is used in downlink, the DwPTS in the special subframe occupies 11 time-domain symbols and the UpPTS in the special subframe occupies 2 time-domain symbols; or Special Subframe Configuration 9: when a normal CP is used in downlink, the DwPTS in the special subframe occupies 6 time-domain symbols and the UpPTS in the special subframe occupies 2 time-domain symbols.

Optionally, the second special subframe configuration can include: Special Subframe Configuration 10: when a normal CP is used in downlink, the DwPTS in the special subframe occupies P time-domain symbols and the UpPTS in the special subframe occupies N time-domain symbol, where P is an integer, P+N≤13 and P≥1. The second special subframe configuration can be selected from a set of special subframe configurations that satisfy the above condition.

Further, the second special subframe configuration can only indicate the number of time-domain symbols occupied by the DwPTS. The UpPTS and GP in the special subframe as indicated in the second special subframe configuration can be determined from the first special subframe configuration. For example, with the knowledge of the first special subframe configuration, the above method can include one of:

determining, by the base station, a number of time-domain symbols occupied by the DwPTS in the special subframe as indicated in the second special subframe configuration, based on a number of time-domain symbols occupied by the DwPTS in the special subframe as indicated in the first special subframe configuration;

determining, by the base station, a number of time-domain symbols occupied by the GP in the special subframe as indicated in the second special subframe configuration, based on the number of time-domain symbols occupied by the DwPTS in the special subframe as indicated in the first special subframe configuration and the number of time-domain symbols occupied by the UpPTS in the special subframe as indicated in the second special subframe configuration;

determining, by the base station, the number of time-domain symbols occupied by the GP in the special subframe as indicated in the second special subframe configuration, based on the number of time-domain symbols occupied by the GP in the special subframe as indicated in the first special subframe configuration; or determining, by the base station, the number of time-domain symbols occupied by the DwPTS in the special subframe as indicated in the second special subframe configuration, based on the number of time-domain symbols occupied by the GP in the special subframe as indicated in the first special subframe configuration and the number of time-domain symbols occupied by the UpPTS in the special subframe as indicated in the second special subframe configuration.

Optionally, the base station determining the number of time-domain symbols occupied by the DwPTS in the special subframe as indicated in the second special subframe configuration based on the number of time-domain symbols occupied by the DwPTS in the special subframe as indicated in the first special subframe configuration can include: determining, by the base station, when the first special subframe configuration indicates that the DwPTS in the special subframe occupies P time-domain symbols, that the number of time-domain symbols occupied by the DwPTS in the special subframe as indicated in the second special subframe configuration is P, where P is an integer and P≥1.

The base station determining the number of time-domain symbols occupied by the GP in the special subframe as indicated in the second special subframe configuration based on the number of time-domain symbols occupied by the DwPTS in the special subframe as indicated in the first special subframe configuration and the number of time-domain symbols occupied by the UpPTS in the special subframe as indicated in the second special subframe configuration can include: determining, by the base station, when the first special subframe configuration indicates that the DwPTS in the special subframe occupies P time-domain symbols, that the number of time-domain symbols occupied by the GP in the special subframe as indicated in the second special subframe configuration is 14−N−P, where P is an integer, P≥1 and 14−N−P≥1.

The base station determining the number of time-domain symbols occupied by the GP in the special subframe as indicated in the second special subframe configuration based on the number of time-domain symbols occupied by the GP in the special subframe as indicated in the first special subframe configuration can include: determining, by the base station, when the first special subframe configuration indicates that the GP in the special subframe occupies Q time-domain symbols, that the number of time-domain symbols occupied by the GP in the special subframe as indicated in the second special subframe configuration is Q, where Q is an integer and Q≥1.

The base station determining the number of time-domain symbols occupied by the DwPTS in the special subframe as indicated in the second special subframe configuration, based on the number of time-domain symbols occupied by the GP in the special subframe as indicated in the first special subframe configuration and the number of time-domain symbols occupied by the UpPTS in the special subframe as indicated in the second special subframe configuration can include: determining, by the base station, when the first special subframe configuration indicates that the GP in the special subframe occupies Q time-domain symbols, that the number of time-domain symbols occupied by the DwPTS in the special subframe as indicated in the second special subframe configuration is 14−N−Q, where Q is an integer, Q≥1 and 14−N−Q≥1.

In this way, the special subframe indicated in the first special subframe configuration and the special subframe indicated in the second special subframe configuration will have the same number of time-domain symbols occupied by the GP or the same number of time-domain symbols occupied by the DwPTS.

Optionally, the base station can transmit the first special subframe configuration to the UE via a System Information Block (SIB) broadcast signaling message, and/or transmit the second special subframe configuration to the UE via a predetermined signaling message. The predetermined signaling message includes one of a SIB broadcast signaling message or a higher layer Radio Resource Control (RRC) signaling message.

In an embodiment, a method for signaling configuration is provided. The method includes a step of transmitting, by a base station, a predetermined signaling message to a UE. The predetermined signaling message is for updating at least one of: a number of time-domain symbols, among time-domain symbols occupied by a GP in a special subframe, that are available for Sounding Reference Signal (SRS) transmission; or a number of time-domain symbols occupied by an UpPTS to be added in the special subframe. Optionally, the predetermined signaling message can include a SIB signaling message and/or an RRC signaling message.

In the above method, the predetermined signaling message can update the number of time-domain symbols, among the time-domain symbols occupied by the GP in the special subframe, that are available for SRS transmission; or the number of time-domain symbols occupied by the UpPTS to be added in the special subframe. Thus, in an existing special subframe configuration, it is possible to transmit the SRS over the time-domain symbols occupied by the GP, or the number of time-domain symbols occupied by the UpPTS available for transmitting the SRS can be increased. In this way, the problem associated with low multiplexing capacity of SRSs can be solved and the multiplexing capacity of SRSs can be improved.

For example, assuming that an existing special subframe configuration indicates that one time-domain symbol is occupied by the UpPTS and, according to the update in the predetermined signaling message, one time-domain symbol is occupied by the UpPTS to be added, then two time-domain symbols will be occupied by the UpPTS in the special subframe after the updating. When compared with one time-domain symbol being occupied by the UpPTS as indicated in the existing special subframe configuration, the number of time-domain symbols for SRS transmission can be increased, such that the multiplexing capacity of SRSs can be improved.

Optionally, the time-domain symbols, among the time-domain symbols occupied by the GP, that are available for SRS transmission are those adjacent to the UpPTS.

Figure 3:
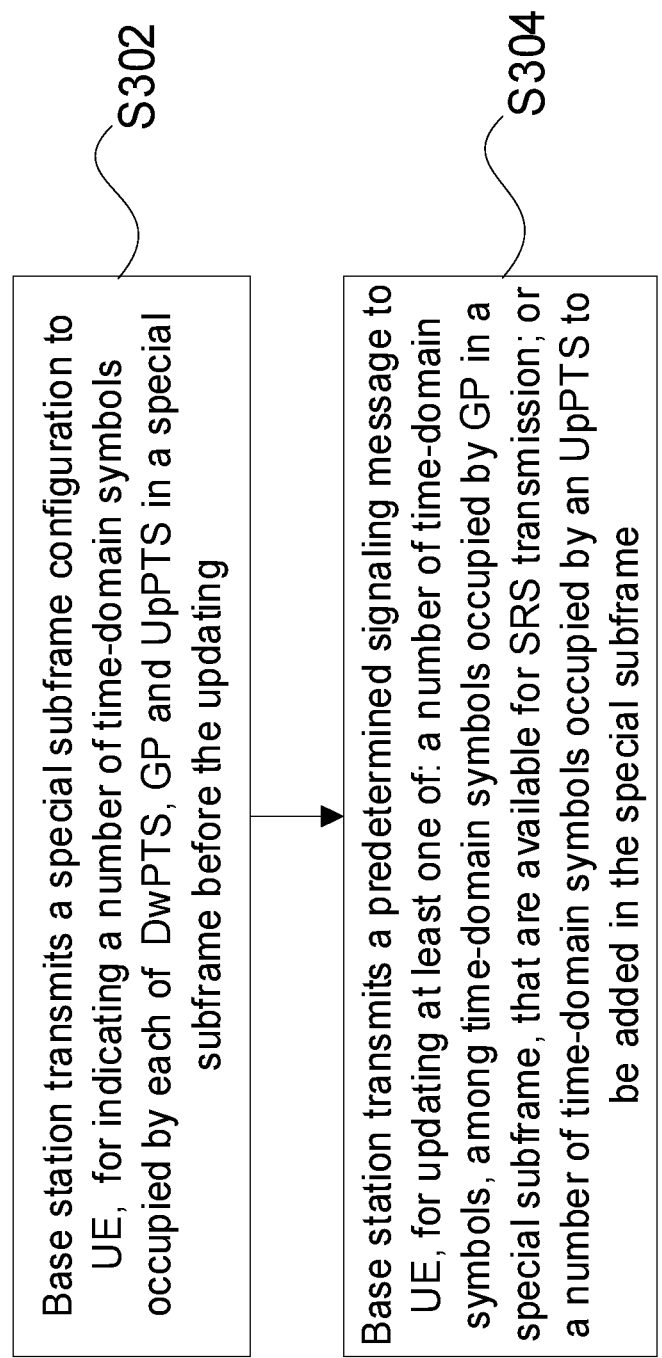
FIG. 3 is an optional flowchart illustrating a method for signaling configuration according to an embodiment of the present disclosure.

FIG. 3 is an optional flowchart illustrating a method for signaling configuration according to an embodiment of the present disclosure. As shown in FIG. 3, the method includes the following steps.

At step S302, a base station transmits a special subframe configuration to a UE, for indicating a number of time-domain symbols occupied by a DwPTS, a number of time-domain symbols occupied by a GP and a number of time-domain symbols occupied by an UpPTS in a special subframe before updating.

At step S304, the base station transmits a predetermined signaling message to the UE. The predetermined signaling message is for updating at least one of: a number of time-domain symbols, among time-domain symbols occupied by the in the special subframe, that are available for SRS transmission; or a number of time-domain symbols occupied by the UpPTS to be added in the special subframe.

Optionally, after transmitting the special subframe configuration to the UE, the base station can determine a number of time-domain symbols occupied by the DwPTS, a number of time-domain symbols occupied by the GP and a number of time-domain symbols occupied by the UpPTS in the special subframe after the updating, based on the special subframe configuration and the predetermined signaling message.

Optionally, when the predetermined signaling message is for updating only the number of time-domain symbols, among the time-domain symbols occupied by the GP in the special subframe, that are available for SRS transmission, the base station determines the number of time-domain symbols occupied by the DwPTS, the number of time-domain symbols occupied by the GP and the number of time-domain symbols occupied by the UpPTS in the special subframe after the updating to be the same as those before the updating.

Optionally, when the predetermined signaling message is for updating at least the number of time-domain symbols occupied by the UpPTS to be added in the special subframe, the base station determining the number of time-domain symbols occupied by the DwPTS, the number of time-domain symbols occupied by the GP and the number of time-domain symbols occupied by the UpPTS in the special subframe after the updating based on the special subframe configuration and the predetermined signaling message can include one of:

determining, by the base station, the number of time-domain symbols occupied by the DwPTS in the special subframe after the updating to be the same as that before the updating; or determining, by the base station, the number of time-domain symbols occupied by the GP in the special subframe after the updating to be the same as that before the updating.

Optionally, before transmitting the predetermined signaling message to the UE, the base station determines the number of time-domain symbols, among the time-domain symbols occupied by the GP in the special subframe, that are available for SRS transmission after the updating and/or the number of time-domain symbols occupied by the UpPTS to be added in the special subframe after the updating, based on at least one of: a radius of a cell in which the UE is located, a number of active UEs in the cell in which the UE is located, or a special subframe configuration of the special subframe before the updating.

Optionally, the larger the radius of the cell is and/or the larger the number of UEs in the cell is, the larger the number of time-domain symbols, among the time-domain symbols occupied by the GP, that are available for SRS transmission and/or the number of time-domain symbols occupied by the UpPTS to be added will be.

Optionally, the SRS can include at least one of a periodic SRS and an aperiodic SRS.

In an embodiment, a method for signaling configuration, corresponding to the above method for signaling configuration, is also provided. The method includes a step of: receiving, by a UE, a special subframe configuration. The special subframe configuration indicates at least that an UpPTS occupies N time-domain symbols in a special subframe, where N is an integer and $3 \le N \le 10$.

Optionally, the UE receiving the special subframe configuration can include: receiving, by the UE, a first special subframe configuration and a second special subframe configuration, or receiving, by the UE, the second special subframe configuration. The first special subframe configuration indicates at least that the UpPTS occupies M time-domain symbols in the special subframe, where M is an integer and $1 \le M \le 2$, and the second special subframe configuration indicates at least that the UpPTS occupies N time-domain symbols in the special subframe, where N is an integer and $3 \le N \le 10$.

Optionally, the first special subframe configuration is a normal special subframe configuration and the second special subframe configuration is an extended special subframe configuration.

Optionally, the first special subframe configuration can include one of:

Special Subframe Configuration 0: when a normal CP is used in downlink, a DwPTS in the special subframe occupies 3 time-domain symbols and the UpPTS in the special subframe occupies 1 time-domain symbol;

Special Subframe Configuration 1: when a normal CP is used in downlink, the DwPTS in the special subframe occupies 9 time-domain symbols and the UpPTS in the special subframe occupies 1 time-domain symbol;

Special Subframe Configuration 2: when a normal CP is used in downlink, the DwPTS in the special subframe occupies 10 time-domain symbols and the UpPTS in the special subframe occupies 1 time-domain symbol;

Special Subframe Configuration 3: when a normal CP is used in downlink, the DwPTS in the special subframe occupies 11 time-domain symbols and the UpPTS in the special subframe occupies 1 time-domain symbol;

Special Subframe Configuration 4: when a normal CP is used in downlink, the DwPTS in the special subframe occupies 12 time-domain symbols and the UpPTS in the special subframe occupies 1 time-domain symbol;

Special Subframe Configuration 5: when a normal CP is used in downlink, the DwPTS in the special subframe occupies 3 time-domain symbols and the UpPTS in the special subframe occupies 2 time-domain symbols;

Special Subframe Configuration 6: when a normal CP is used in downlink, the DwPTS in the special subframe occupies 9 time-domain symbols and the UpPTS in the special subframe occupies 2 time-domain symbols;

Special Subframe Configuration 7: when a normal CP is used in downlink, the DwPTS in the special subframe occupies 10 time-domain symbols and the UpPTS in the special subframe occupies 2 time-domain symbols;

Special Subframe Configuration 8: when a normal CP is used in downlink, the DwPTS in the special subframe occupies 11 time-domain symbols and the UpPTS in the special subframe occupies 2 time-domain symbols; or Special Subframe Configuration 9: when a normal CP is used in downlink, the DwPTS in the special subframe occupies 6 time-domain symbols and the UpPTS in the special subframe occupies 2 time-domain symbols.

Optionally, the second special subframe configuration can include: Special Subframe Configuration 10: when a normal CP is used in downlink, the DwPTS in the special subframe occupies P time-domain symbols and the UpPTS in the special subframe occupies N time-domain symbol, where P is an integer, $P+N \leq 13$ and $P \geq 1$.

Optionally, the method can further include, subsequent to the UE receiving the special subframe configuration, one of:

determining, by the UE, a number of time-domain symbols occupied by the DwPTS in the special subframe as indicated in the second special subframe configuration, based on a number of time-domain symbols occupied by the DwPTS in the special subframe as indicated in the first special subframe configuration;

determining, by the UE, a number of time-domain symbols occupied by a GP in the special subframe as indicated in the second special subframe configuration, based on the number of time-domain symbols occupied by the DwPTS in the special subframe as indicated in the first special subframe configuration and the number of time-domain symbols occupied by the UpPTS in the special subframe as indicated in the second special subframe configuration;

determining, by the UE, the number of time-domain symbols occupied by the GP in the special subframe as indicated in the second special subframe configuration, based on the number of time-domain symbols occupied by the GP in the special subframe as indicated in the first special subframe configuration; or determining, by the UE, the number of time-domain symbols occupied by the DwPTS in the special subframe as indicated in the second special subframe configuration, based on the number of time-domain symbols occupied by the GP in the special subframe as indicated in the first special subframe configuration and the number of time-domain symbols occupied by the UpPTS in the special subframe as indicated in the second special subframe configuration.

Optionally, the UE determining the number of time-domain symbols occupied by the DwPTS in the special subframe as indicated in the second special subframe configuration based on the number of time-domain symbols occupied by the DwPTS in the special subframe as indicated in the first special subframe configuration can include: determining, by the UE, when the first special subframe configuration indicates that the DwPTS in the special subframe occupies P time-domain symbols, that the number of time-domain symbols occupied by the DwPTS in the special subframe as indicated in the second special subframe configuration is P, where P is an integer and $P \geq 1$.

Optionally, the UE determining the number of time-domain symbols occupied by the GP in the special subframe as indicated in the second special subframe configuration based on the number of time-domain symbols occupied by the DwPTS in the special subframe as indicated in the first special subframe configuration and the number of time-domain symbols occupied by the UpPTS in the special subframe as indicated in the second special subframe configuration can include: determining, by the UE, when the first special subframe configuration indicates that the DwPTS in the special subframe occupies P time-domain symbols, that the number of time-domain symbols occupied by the GP in the special subframe as indicated in the second special subframe configuration is $14-N-P$, where P is an integer, $P \geq 1$ and $14-N-P \geq 1$.

Optionally, the UE determining the number of time-domain symbols occupied by the GP in the special subframe as indicated in the second special subframe configuration based on the number of time-domain symbols occupied by the GP in the special subframe as indicated in the first special subframe configuration can include: determining, by the UE, when the first special subframe configuration indicates that the GP in the special subframe occupies Q time-domain symbols, that the number of time-domain symbols occupied by the GP in the special subframe as indicated in the second special subframe configuration is Q, where Q is an integer and $Q \geq 1$.

Optionally, the UE determining the number of time-domain symbols occupied by the DwPTS in the special subframe as indicated in the second special subframe configuration, based on the number of time-domain symbols occupied by the GP in the special subframe as indicated in the first special subframe configuration and the number of time-domain symbols occupied by the UpPTS in the special subframe as indicated in the second special subframe configuration can include: determining, by the UE, when the first special subframe configuration indicates that the GP in the special subframe occupies Q time-domain symbols, that the number of time-domain symbols occupied by the DwPTS in the special subframe as indicated in the second special subframe configuration is $14-N-Q$, where Q is an integer, $Q \geq 1$ and $14-N-Q \geq 1$.

Optionally, the UE receiving the special subframe configuration can include: receiving, by the UE, the first special subframe configuration via a System Information Block (SIB) broadcast signaling message; and/or receiving, by the UE, the second special subframe configuration via a predetermined signaling message. The predetermined signaling message can include one of a SIB broadcast signaling message or a higher layer Radio Resource Control (RRC) signaling message.

In an embodiment, a method for signaling configuration, corresponding to the above method for signaling configuration, is also provided. The method includes a step of: receiving, by a UE, a predetermined signaling message. The predetermined signaling message is for updating at least one of: a number of time-domain symbols, among time-domain symbols occupied by a GP in a special subframe, that are available for SRS transmission; or a number of time-domain symbols occupied by an UpPTS to be added in the special subframe.

Optionally, before receiving the predetermined signaling message, the UE can receive a special subframe configuration, for indicating a number of time-domain symbols occupied by a DwPTS, a number of time-domain symbols occupied by the GP and a number of time-domain symbols occupied by the UpPTS in the special subframe before the updating.

Optionally, after receiving the predetermined signaling message, the UE determines a number of time-domain symbols occupied by the DwPTS, a number of time-domain symbols occupied by the GP and a number of time-domain symbols occupied by the UpPTS in the special subframe after the updating, based on the special subframe configuration and the predetermined signaling message.

Optionally, when the predetermined signaling message is for updating only the number of time-domain symbols, among the time-domain symbols occupied by the GP in the special subframe, that are available for SRS transmission, the UE determining the number of time-domain symbols occupied by the DwPTS, the number of time-domain symbols occupied by the GP and the number of time-domain symbols occupied by the UpPTS in the special subframe after the updating based on the special subframe configuration and the predetermined signaling message can include: determining, by the UE, the number of time-domain symbols occupied by the DwPTS, the number of time-domain symbols occupied by the GP and the number of time-domain symbols occupied by the UpPTS in the special subframe after the updating to be the same as those before the updating.

Optionally, when the predetermined signaling message is for updating at least the number of time-domain symbols occupied by the UpPTS to be added in the special subframe, the UE determining the number of time-domain symbols occupied by the DwPTS, the number of time-domain symbols occupied by the GP and the number of time-domain symbols occupied by the UpPTS in the special subframe after the updating based on the special subframe configuration and the predetermined signaling message can include one of: determining, by the UE, the number of time-domain symbols occupied by the DwPTS in the special subframe after the updating to be the same as that before the updating; or determining, by the UE, the number of time-domain symbols occupied by the GP in the special subframe after the updating to be the same as that before the updating.

Optionally, the number of time-domain symbols, among the time-domain symbols occupied by the GP in the special subframe, that are available for SRS transmission after the updating and/or the number of time-domain symbols occupied by the UpPTS to be added in the special subframe after the updating can be determined based on at least one of: a radius of a cell in which the UE is located, a number of active UEs in the cell in which the UE is located, or a special subframe configuration of the special subframe before the updating.

Optionally, the SRS can include at least one of a periodic SRS and an aperiodic SRS.

Figure 6:
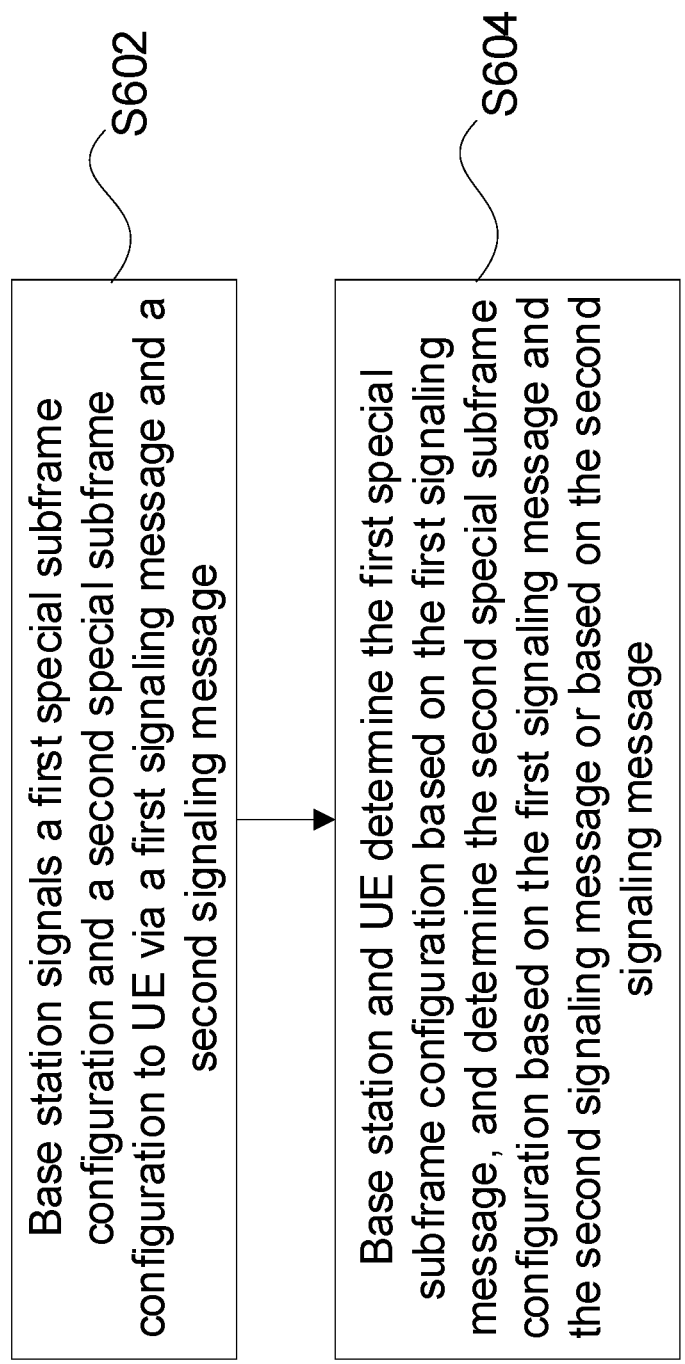
FIG. 6 is a first flowchart illustrating a method for signaling configuration according to an embodiment of the present disclosure.

In an embodiment, a method applied in a TDD system for signaling configuration is provided. FIG. 6 is a flowchart illustrating a method for signaling configuration according to an embodiment of the present disclosure. As shown in FIG. 6, the method includes the following steps.

At step S602, a base station signals a first special subframe configuration and a second special subframe configuration to a UE via a first signaling message and a second signaling message.

At step S604, the base station and the UE determine the first special subframe configuration based on the first signaling message, and determine the second special subframe configuration based on the first signaling message and the second signaling message or based on the second signaling message.

Optionally, the base station signaling the first special subframe configuration and the second special subframe configuration to the UE via the first signaling message and the second signaling message can include: selecting, by the base station, the first special subframe configuration and the second special subframe configuration from a set of special subframe configurations, and transmitting the first special subframe configuration and the second special subframe configuration to the UE via the first signaling message and the second signaling message, respectively. The first signaling message and the second signaling message are each a broadcast signaling message carried in a System Information Block (SIB) for indicating special subframe configuration. Alternatively, the base station signaling the first special subframe configuration and the second special subframe configuration to the UE via the first signaling message and the second signaling message can include: selecting, by the base station, the first special subframe configuration from the set of special subframe configurations, transmitting the first special subframe configuration to the UE via the first signaling message, and indicating the second special subframe configuration to the UE via the second signaling message. The first signaling message is a broadcast signaling message carried in a SIB for indicating the first special subframe configuration, and the second signaling message is a broadcast signaling message carried in a SIB or in a UE-specific Radio Resource Control (RRC) signaling message for indicating the second special subframe configuration. A special subframe indicated in the first special subframe configuration contains M time-domain symbols for Sounding Reference Signal (SRS) transmission or M UpPTS symbols, where M is an integer and 1≤M≤2. A special subframe indicated in the second special subframe configuration contains N time-domain symbols for SRS transmission or N UpPTS symbols, where N is an integer and 3≤N≤10.

Optionally, the first special subframe configuration can be a normal special subframe configuration and the second special subframe configuration can be an extended special subframe configuration.

Optionally, the first special subframe configuration can include one of:

Special Subframe Configuration 0: when a normal CP is used in downlink, a DwPTS in the special subframe occupies 3 time-domain symbols and the UpPTS in the special subframe occupies 1 time-domain symbol;

Special Subframe Configuration 1: when a normal CP is used in downlink, the DwPTS in the special subframe occupies 9 time-domain symbols and the UpPTS in the special subframe occupies 1 time-domain symbol;

Special Subframe Configuration 2: when a normal CP is used in downlink, the DwPTS in the special subframe occupies 10 time-domain symbols and the UpPTS in the special subframe occupies 1 time-domain symbol;

Special Subframe Configuration 3: when a normal CP is used in downlink, the DwPTS in the special subframe occupies 11 time-domain symbols and the UpPTS in the special subframe occupies 1 time-domain symbol;

Special Subframe Configuration 4: when a normal CP is used in downlink, the DwPTS in the special subframe occupies 12 time-domain symbols and the UpPTS in the special subframe occupies 1 time-domain symbol;

Special Subframe Configuration 5: when a normal CP is used in downlink, the DwPTS in the special subframe occupies 3 time-domain symbols and the UpPTS in the special subframe occupies 2 time-domain symbols;

Special Subframe Configuration 6: when a normal CP is used in downlink, the DwPTS in the special subframe occupies 9 time-domain symbols and the UpPTS in the special subframe occupies 2 time-domain symbols;

Special Subframe Configuration 7: when a normal CP is used in downlink, the DwPTS in the special subframe occupies 10 time-domain symbols and the UpPTS in the special subframe occupies 2 time-domain symbols;

Special Subframe Configuration 8: when a normal CP is used in downlink, the DwPTS in the special subframe occupies 11 time-domain symbols and the UpPTS in the special subframe occupies 2 time-domain symbols; or Special Subframe Configuration 9: when a normal CP is used in downlink, the DwPTS in the special subframe occupies 6 time-domain symbols and the UpPTS in the special subframe occupies 2 time-domain symbols.

Optionally, the second special subframe configuration can be one of a plurality of special subframe configurations satisfying a condition that: when a normal CP is used in downlink, the DwPTS in the special subframe occupies P time-domain symbols and the UpPTS in the special subframe occupies N time-domain symbol, where P is an integer, P+N≤13 and P≥1.

Optionally, the second special subframe configuration can be one of a plurality of special subframe configurations satisfying a condition that: when a normal CP is used in downlink, the DwPTS in the special subframe occupies P time-domain symbols and the UpPTS in the special subframe occupies N time-domain symbol, where P is an integer, P+N≤13 and 6≤P≤8, or when a normal CP is used in downlink, the DwPTS in the special subframe occupies P time-domain symbols and the UpPTS in the special subframe occupies N time-domain symbol, where P is an integer, P+N≤13 and 1≤P≤5.

Optionally, the second special subframe configuration can be determined based on the first signaling message and the second signaling message by:

determining, by the base station and the UE, the first special subframe configuration based on the first signaling message, so as to obtain a number of time-domain symbols occupied by the DwPTS or a number of time-domain symbols occupied by a GP in the first special subframe configuration; and determining, by the base station and the UE, a number of time-domain symbols occupied by the UpPTS in the second special subframe configuration based on the second signaling message, and determining, by the base station and the UE, a number of time-domain symbols occupied by the DwPTS or a number of time-domain symbols occupied by the GP in the second special subframe configuration, based on the number of time-domain symbols occupied by the DwPTS in the first special subframe configuration; or determining, by the base station and the UE, the number of time-domain symbols occupied by the UpPTS in the second special subframe configuration based on the second signaling message, and determining, by the base station and the UE, the number of time-domain symbols occupied by the DwPTS or the number of time-domain symbols occupied by the GP in the second special subframe configuration, based on the number of time-domain symbols occupied by the GP in the first special subframe configuration.

Optionally, the operation of determining the number of time-domain symbols occupied by the DwPTS or the number of time-domain symbols occupied by the GP in the second special subframe configuration based on the number of time-domain symbols occupied by the DwPTS in the first special subframe configuration can include:

determining the number of time-domain symbols occupied by the DwPTS in the second special subframe configuration to be equal to the number of time-domain symbols occupied by the DwPTS in the first special subframe configuration, or determining the number of time-domain symbols occupied by the GP in the second special subframe configuration to be equal to a value obtained by subtracting the number of time-domain symbols occupied by the UpPTS in the second special subframe configuration and the number of time-domain symbols occupied by the DwPTS in the first special subframe configuration from 14, i.e., (14−the number of time-domain symbols occupied by the UpPTS in the second special subframe configuration−the number of time-domain symbols occupied by the DwPTS in the first special subframe configuration).

Optionally, the operation of determining the number of time-domain symbols occupied by the DwPTS or the number of time-domain symbols occupied by the GP in the second special subframe configuration based on the number of time-domain symbols occupied by the GP in the first special subframe configuration can include:

determining the number of time-domain symbols occupied by the DwPTS in the second special subframe configuration to be equal to a value obtained by subtracting the number of time-domain symbols occupied by the UpPTS in the second special subframe configuration and the number of time-domain symbols occupied by the GP in the first special subframe configuration from 14, i.e., (14−the number of time-domain symbols occupied by the UpPTS in the second special subframe configuration−the number of time-domain symbols occupied by the GP in the first special subframe configuration), or determining the number of time-domain symbols occupied by the GP in the second special subframe configuration to be equal to the number of time-domain symbols occupied by the GP in the first special subframe configuration.

Optionally, when the second signaling message is a System Information Block (SIB) broadcast signaling message and the SIB broadcast signaling message is configured by the base station or configured by the base station to be valid, the second signaling message indicates at least one of: a number of time-domain symbols occupied by the UpPTS in the special subframe for the UE is larger than 3; a number of time-domain symbols occupied by the DwPTS in the special subframe for the UE equals to a number of time-domain symbols occupied by the DwPTS indicated in the first special subframe configuration; or a number of time-domain symbols occupied by the GP in the special subframe for the UE equals to a number of time-domain symbols occupied by the GP indicated in the first special subframe configuration. Alternatively, when the second signaling message is a Radio Resource Control (RRC) signaling message, the second signaling message indicates at least one of: the number of time-domain symbols occupied by the UpPTS in the special subframe for the UE equals to 1 or 2; the number of time-domain symbols occupied by the UpPTS in the special subframe for the UE is larger than 3 and the number of time-domain symbols occupied by the DwPTS in the special subframe for the UE equals to the number of time-domain symbols occupied by the DwPTS indicated in the first special subframe configuration; or the number of time-domain symbols occupied by the UpPTS in the special subframe for the UE is larger than 3 and the number of time-domain symbols occupied by the GP in the special subframe for the UE equals to the number of time-domain symbols occupied by the GP indicated in the first special subframe configuration.

Figure 7:
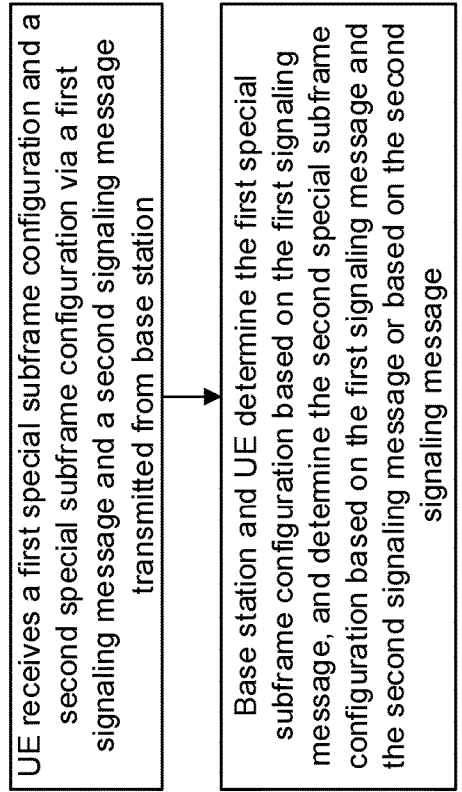
FIG. 7 is a second flowchart illustrating a method for signaling configuration according to an embodiment of the present disclosure.

In an embodiment of the present disclosure, a method for signaling configuration is provided, as shown in FIG. 7. The method includes a step of receiving, by a UE, a first special subframe configuration and a second special subframe configuration via a first signaling message and a second signaling message transmitted from a base station. The first special subframe configuration is determined by the base station and the UE based on the first signaling message, and the second special subframe configuration is determined by the base station and the UE based on the first signaling message and the second signaling message or based on the second signaling message.

Optionally, the UE receiving the first special subframe configuration and the second special subframe configuration via the first signaling message and the second signaling message transmitted from the base station can include: receiving, by the UE, the first special subframe configuration via the first signaling message and the second special subframe configuration via the second signaling message. The first signaling message and the second signaling message are each a broadcast signaling message carried in a System Information Block (SIB) for indicating special subframe configuration. Alternatively, the UE receiving the first special subframe configuration and the second special subframe configuration via the first signaling message and the second signaling message transmitted from the base station includes: receiving, by the UE, the first special subframe configuration via the first signaling message, and information indicating the second special subframe configuration via the second signaling message. The first signaling message is a broadcast signaling message carried in a SIB for indicating the first special subframe configuration, and the second signaling message is a broadcast signaling message carried in a SIB or in a UE-specific Radio Resource Control (RRC) signaling message for indicating the second special subframe configuration. A special subframe indicated in the first special subframe configuration contains M time-domain symbols for Sounding Reference Signal (SRS) transmission or M UpPTS symbols, where M is an integer and $1 \leq M \leq 2$. A special subframe indicated in the second special subframe configuration contains N time-domain symbols for SRS transmission or N UpPTS symbols, where N is an integer and $3 \leq N \leq 10$.

Optionally, the first special subframe configuration can be a normal special subframe configuration and the second special subframe configuration can be an extended special subframe configuration.

Optionally, the first special subframe configuration can include one of:

Special Subframe Configuration 0: when a normal CP is used in downlink, a DwPTS in the special subframe occupies 3 time-domain symbols and the UpPTS in the special subframe occupies 1 time-domain symbol;

Special Subframe Configuration 1: when a normal CP is used in downlink, the DwPTS in the special subframe occupies 9 time-domain symbols and the UpPTS in the special subframe occupies 1 time-domain symbol;

Special Subframe Configuration 2: when a normal CP is used in downlink, the DwPTS in the special subframe occupies 10 time-domain symbols and the UpPTS in the special subframe occupies 1 time-domain symbol;

Special Subframe Configuration 3: when a normal CP is used in downlink, the DwPTS in the special subframe occupies 11 time-domain symbols and the UpPTS in the special subframe occupies 1 time-domain symbol;

Special Subframe Configuration 4: when a normal CP is used in downlink, the DwPTS in the special subframe occupies 12 time-domain symbols and the UpPTS in the special subframe occupies 1 time-domain symbol;

Special Subframe Configuration 5: when a normal CP is used in downlink, the DwPTS in the special subframe occupies 3 time-domain symbols and the UpPTS in the special subframe occupies 2 time-domain symbols;

Special Subframe Configuration 6: when a normal CP is used in downlink, the DwPTS in the special subframe occupies 9 time-domain symbols and the UpPTS in the special subframe occupies 2 time-domain symbols;

Special Subframe Configuration 7: when a normal CP is used in downlink, the DwPTS in the special subframe occupies 10 time-domain symbols and the UpPTS in the special subframe occupies 2 time-domain symbols;

Special Subframe Configuration 8: when a normal CP is used in downlink, the DwPTS in the special subframe occupies 11 time-domain symbols and the UpPTS in the special subframe occupies 2 time-domain symbols; or Special Subframe Configuration 9: when a normal CP is used in downlink, the DwPTS in the special subframe occupies 6 time-domain symbols and the UpPTS in the special subframe occupies 2 time-domain symbols.

Optionally, the second special subframe configuration can be one of a plurality of special subframe configurations satisfying a condition that: when a normal CP is used in downlink, the DwPTS in the special subframe occupies P time-domain symbols and the UpPTS in the special subframe occupies N time-domain symbol, where P is an integer, $P+N \leq 13$ and $P \geq 1$.

Optionally, the second special subframe configuration can be one of a plurality of special subframe configurations satisfying a condition that: when a normal CP is used in downlink, the DwPTS in the special subframe occupies P time-domain symbols and the UpPTS in the special subframe occupies N time-domain symbol, where P is an integer, $P+N \leq 13$ and $6 \leq P \leq 8$, or when a normal CP is used in downlink, the DwPTS in the special subframe occupies P time-domain symbols and the UpPTS in the special subframe occupies N time-domain symbol, where P is an integer, $P+N \leq 13$ and $1 \leq P \leq 5$.

Optionally, the second special subframe configuration can be determined based on the first signaling message and the second signaling message by:

determining, by the base station and the UE, the first special subframe configuration based on the first signaling message, so as to obtain a number of time-domain symbols occupied by the DwPTS or a number of time-domain symbols occupied by a GP in the first special subframe configuration; and determining, by the base station and the UE, a number of time-domain symbols occupied by the UpPTS in the second special subframe configuration based on the second signaling message, and determining, by the base station and the UE, a number of time-domain symbols occupied by the DwPTS or a number of time-domain symbols occupied by the GP in the second special subframe configuration, based on the number of time-domain symbols occupied by the DwPTS in the first special subframe configuration; or determining, by the base station and the UE, the number of time-domain symbols occupied by the UpPTS in the second special subframe configuration based on the second signaling message, and determining, by the base station and the UE, the number of time-domain symbols occupied by the DwPTS or the number of time-domain symbols occupied by the GP in the second special subframe configuration, based on the number of time-domain symbols occupied by the GP in the first special subframe configuration.

Optionally, the operation of determining the number of time-domain symbols occupied by the DwPTS or the number of time-domain symbols occupied by the GP in the second special subframe configuration based on the number of time-domain symbols occupied by the DwPTS in the first special subframe configuration can include:

determining the number of time-domain symbols occupied by the DwPTS in the second special subframe configuration to be equal to the number of time-domain symbols occupied by the DwPTS in the first special subframe configuration, or determining the number of time-domain symbols occupied by the GP in the second special subframe configuration to be equal to a value obtained by subtracting the number of time-domain symbols occupied by the UpPTS in the second special subframe configuration and the number of time-domain symbols occupied by the DwPTS in the first special subframe configuration from 14, i.e., (14−the number of time-domain symbols occupied by the UpPTS in the second special subframe configuration−the number of time-domain symbols occupied by the DwPTS in the first special subframe configuration).

Optionally, the operation of determining the number of time-domain symbols occupied by the DwPTS or the number of time-domain symbols occupied by the GP in the second special subframe configuration based on the number of time-domain symbols occupied by the GP in the first special subframe configuration includes:

determining the number of time-domain symbols occupied by the DwPTS in the second special subframe configuration to be equal to a value obtained by subtracting the number of time-domain symbols occupied by the UpPTS in the second special subframe configuration and the number of time-domain symbols occupied by the GP in the first special subframe configuration from 14, i.e., (14−the number of time-domain symbols occupied by the UpPTS in the second special subframe configuration−the number of time-domain symbols occupied by the GP in the first special subframe configuration), or determining the number of time-domain symbols occupied by the GP in the second special subframe configuration to be equal to the number of time-domain symbols occupied by the GP in the first special subframe configuration.

Optionally, when the second signaling message is a System Information Block (SIB) broadcast signaling message and the SIB broadcast signaling message is configured by the base station or configured by the base station to be valid, the second signaling message can indicate at least one of: a number of time-domain symbols occupied by the UpPTS in the special subframe for the UE is larger than 3; a number of time-domain symbols occupied by the DwPTS in the special subframe for the UE equals to a number of time-domain symbols occupied by the DwPTS indicated in the first special subframe configuration; or a number of time-domain symbols occupied by the GP in the special subframe for the UE equals to a number of time-domain symbols occupied by the GP indicated in the first special subframe configuration. Alternatively, when the second signaling message is a Radio Resource Control (RRC) signaling message, the second signaling message can indicate at least one of: the number of time-domain symbols occupied by the UpPTS in the special subframe for the UE equals to 1 or 2; the number of time-domain symbols occupied by the UpPTS in the special subframe for the UE is larger than 3 and the number of time-domain symbols occupied by the DwPTS in the special subframe for the UE equals to the number of time-domain symbols occupied by the DwPTS indicated in the first special subframe configuration; or the number of time-domain symbols occupied by the UpPTS in the special subframe for the UE is larger than 3 and the number of time-domain symbols occupied by the GP in the special subframe for the UE equals to the number of time-domain symbols occupied by the GP indicated in the first special subframe configuration.

With the description of the above embodiments, it will be apparent to those skilled in the art that the method according to the above embodiments can be implemented by means of software plus a necessary general-purpose hardware platform. Of course it can be implemented in hardware, but in many cases the former is the optimal implementation. Based on this understanding, the technical solution of the present disclosure in essence, or parts thereof contributive to the prior art, can be embodied in the form of a software product. The computer software product can be stored in a storage medium (e.g., ROM/RAM, magnetic disk, or optical disc) and includes instructions for causing a terminal device (which may be a mobile phone, a computer, a server, or a network device, etc.) to perform the method described in the various embodiments of the present disclosure.

According to an embodiment of the present disclosure, an apparatus for signaling configuration is also provided. The apparatus can be applied in a base station for implementing the above embodiments and optional embodiments (details thereof will be omitted here). As used hereinafter, the term "module" can be software, hardware, or a combination thereof, capable of performing a predetermined function. While the apparatuses to be described in the following embodiments are preferably implemented in software, it can be contemplated that they can also be implemented in hardware or a combination of software and hardware.

Figure 8:
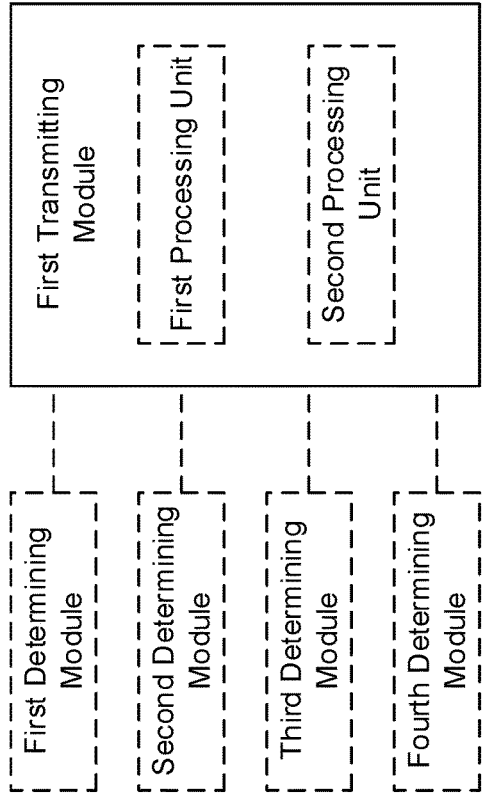
FIG. 8 is a first schematic diagram showing an apparatus for signaling configuration according to an embodiment of the present disclosure.

In an embodiment of the present disclosure, an apparatus for signaling configuration is provided, as shown in FIG. 8. The apparatus includes a first transmitting module configured to transmit a special subframe configuration to a UE. The special subframe configuration indicates at least that an UpPTS occupies N time-domain symbols in a special subframe, where N is an integer and $3 \leq N \leq 10$.

Optionally, the apparatus can include a first processing unit configured to select station, a first special subframe configuration and a second special subframe configuration from a set of special subframe configurations, and transmit the special subframe configuration including the first special subframe configuration and the second special subframe configuration to the UE; or a second processing unit configured to select the second special subframe configuration from the set of special subframe configurations, and transmit the special subframe configuration including the second special subframe configuration to the UE. The first special subframe configuration indicates at least that the UpPTS occupies M time-domain symbols in the special subframe, where M is an integer and $1 \leq M \leq 2$. The second special subframe configuration indicates at least that the UpPTS occupies N time-domain symbols in the special subframe, where N is an integer and $3 \leq N \leq 10$.

Optionally, the first special subframe configuration can be a normal special subframe configuration and the second special subframe configuration can be an extended special subframe configuration.

Optionally, the first special subframe configuration can include one of:

Special Subframe Configuration 0: when a normal CP is used in downlink, a DwPTS in the special subframe occupies 3 time-domain symbols and the UpPTS in the special subframe occupies 1 time-domain symbol;

Special Subframe Configuration 1: when a normal CP is used in downlink, the DwPTS in the special subframe occupies 9 time-domain symbols and the UpPTS in the special subframe occupies 1 time-domain symbol;

Special Subframe Configuration 2: when a normal CP is used in downlink, the DwPTS in the special subframe occupies 10 time-domain symbols and the UpPTS in the special subframe occupies 1 time-domain symbol;

Special Subframe Configuration 3: when a normal CP is used in downlink, the DwPTS in the special subframe occupies 11 time-domain symbols and the UpPTS in the special subframe occupies 1 time-domain symbol;

Special Subframe Configuration 4: when a normal CP is used in downlink, the DwPTS in the special subframe occupies 12 time-domain symbols and the UpPTS in the special subframe occupies 1 time-domain symbol;

Special Subframe Configuration 5: when a normal CP is used in downlink, the DwPTS in the special subframe occupies 3 time-domain symbols and the UpPTS in the special subframe occupies 2 time-domain symbols;

Special Subframe Configuration 6: when a normal CP is used in downlink, the DwPTS in the special subframe occupies 9 time-domain symbols and the UpPTS in the special subframe occupies 2 time-domain symbols;

Special Subframe Configuration 7: when a normal CP is used in downlink, the DwPTS in the special subframe occupies 10 time-domain symbols and the UpPTS in the special subframe occupies 2 time-domain symbols;

Special Subframe Configuration 8: when a normal CP is used in downlink, the DwPTS in the special subframe occupies 11 time-domain symbols and the UpPTS in the special subframe occupies 2 time-domain symbols; or Special Subframe Configuration 9: when a normal CP is used in downlink, the DwPTS in the special subframe occupies 6 time-domain symbols and the UpPTS in the special subframe occupies 2 time-domain symbols.

Optionally, the second special subframe configuration can include: Special Subframe Configuration 10: when a normal CP is used in downlink, the DwPTS in the special subframe occupies P time-domain symbols and the UpPTS in the special subframe occupies N time-domain symbol, where P is an integer, $P+N \leq 13$ and $P \geq 1$.

Optionally, the apparatus can further include one of:

a first determining module coupled to the first transmitting module and configured to determine a number of time-domain symbols occupied by a DwPTS in the special subframe as indicated in the second special subframe configuration, based on a number of time-domain symbols occupied by the DwPTS in the special subframe as indicated in the first special subframe configuration;

a second determining module coupled to the first transmitting module and configured to determine a number of time-domain symbols occupied by a GP in the special subframe as indicated in the second special subframe configuration, based on the number of time-domain symbols occupied by the DwPTS in the special subframe as indicated in the first special subframe configuration and the number of time-domain symbols occupied by the UpPTS in the special subframe as indicated in the second special subframe configuration;

a third determining module coupled to the first transmitting module and configured to determine the number of time-domain symbols occupied by the GP in the special subframe as indicated in the second special subframe configuration, based on the number of time-domain symbols occupied by the GP in the special subframe as indicated in the first special subframe configuration; or a fourth determining module coupled to the first transmitting module and configured to determine the number of time-domain symbols occupied by the DwPTS in the special subframe as indicated in the second special subframe configuration, based on the number of time-domain symbols occupied by the GP in the special subframe as indicated in the first special subframe configuration and the number of time-domain symbols occupied by the UpPTS in the special subframe as indicated in the second special subframe configuration.

Optionally, the first determining module can be configured to determine, when the first special subframe configuration indicates that the DwPTS in the special subframe occupies P time-domain symbols, that the number of time-domain symbols occupied by the DwPTS in the special subframe as indicated in the second special subframe configuration is P, where P is an integer and $P \geq 1$.

Optionally, the second determining module can be configured to determine, when the first special subframe configuration indicates that the DwPTS in the special subframe occupies P time-domain symbols, that the number of time-domain symbols occupied by the GP in the special subframe as indicated in the second special subframe configuration is 14−N−P, where P is an integer, $P \geq 1$ and $14-N-P \geq 1$.

Optionally, the third determining module can be configured to determine, when the first special subframe configuration indicates that the GP in the special subframe occupies Q time-domain symbols, that the number of time-domain symbols occupied by the GP in the special subframe as indicated in the second special subframe configuration is Q, where Q is an integer and $Q \geq 1$.

Optionally, the fourth determining module can be configured to determine, when the first special subframe configuration indicates that the GP in the special subframe occupies Q time-domain symbols, that the number of time-domain symbols occupied by the DwPTS in the special subframe as indicated in the second special subframe configuration is 14−N−Q, where Q is an integer, $Q \geq 1$ and $14-N-Q \geq 1$.

Optionally, the first transmitting module can be configured to transmit the first special subframe configuration to the UE via a System Information Block (SIB) broadcast signaling message; and/or transmitting, by the base station, the second special subframe configuration to the UE via a predetermined signaling message. The predetermined signaling message includes one of a SIB broadcast signaling message or a higher layer Radio Resource Control (RRC) signaling message.

Figure 9:
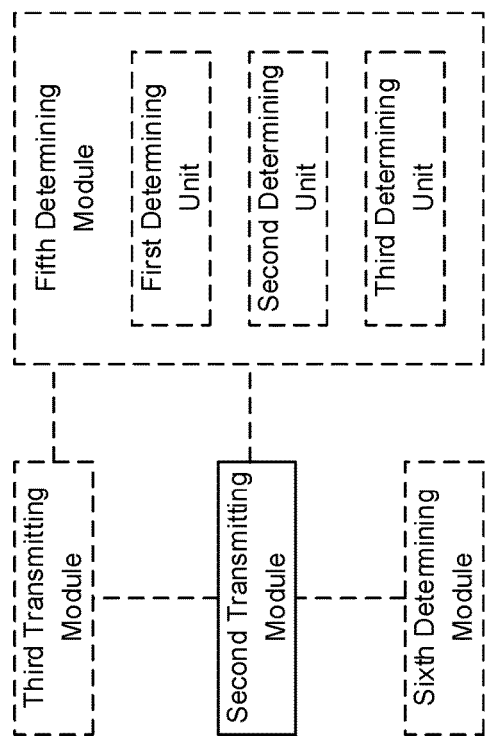
FIG. 9 is a second schematic diagram showing an apparatus for signaling configuration according to an embodiment of the present disclosure.

In an embodiment, an apparatus applied in a base station for signaling configuration is provided, as shown in FIG. 9. The apparatus includes: a second transmitting module configured to transmit a predetermined signaling message to a UE. The predetermined signaling message is for updating at least one of: a number of time-domain symbols, among time-domain symbols occupied by a GP in a special subframe, that are available for Sounding Reference Signal (SRS) transmission; or a number of time-domain symbols occupied by an UpPTS to be added in the special subframe.

Optionally, the apparatus can further include a third transmitting module coupled to the second transmitting module and configured to transmit a special subframe configuration to the UE, for indicating a number of time-domain symbols occupied by a DwPTS, a number of time-domain symbols occupied by the GP and a number of time-domain symbols occupied by the UpPTS in the special subframe before the updating.

Optionally, the apparatus can further include a fifth determining module configured to determine a number of time-domain symbols occupied by the DwPTS, a number of time-domain symbols occupied by the GP and a number of time-domain symbols occupied by the UpPTS in the special subframe after the updating, based on the special subframe configuration and the predetermined signaling message.

Optionally, the fifth determining module can include a first determining unit configured to determine, when the predetermined signaling message is for updating only the number of time-domain symbols, among the time-domain symbols occupied by the GP in the special subframe, that are available for SRS transmission, the number of time-domain symbols occupied by the DwPTS, the number of time-domain symbols occupied by the GP and the number of time-domain symbols occupied by the UpPTS in the special subframe after the updating to be the same as those before the updating.

Optionally, the fifth determining module can include one of: a second determining unit configured to determine, when the predetermined signaling message is for updating at least the number of time-domain symbols occupied by the UpPTS to be added in the special subframe, the number of time-domain symbols occupied by the DwPTS in the special subframe after the updating to be the same as that before the updating; or a third determining unit configured to determine, when the predetermined signaling message is for updating at least the number of time-domain symbols occupied by the UpPTS to be added in the special subframe, the number of time-domain symbols occupied by the GP in the special subframe after the updating to be the same as that before the updating.

Optionally, the apparatus can further include a sixth determining module configured to determine the number of time-domain symbols, among the time-domain symbols occupied by the GP in the special subframe, that are available for SRS transmission after the updating and/or the number of time-domain symbols occupied by the UpPTS to be added in the special subframe after the updating, based on at least one of: a radius of a cell in which the UE is located, a number of active UEs in the cell in which the UE is located, or a special subframe configuration of the special subframe before the updating.

Optionally, the SRS can include at least one of a periodic SRS and an aperiodic SRS.

Figure 10:
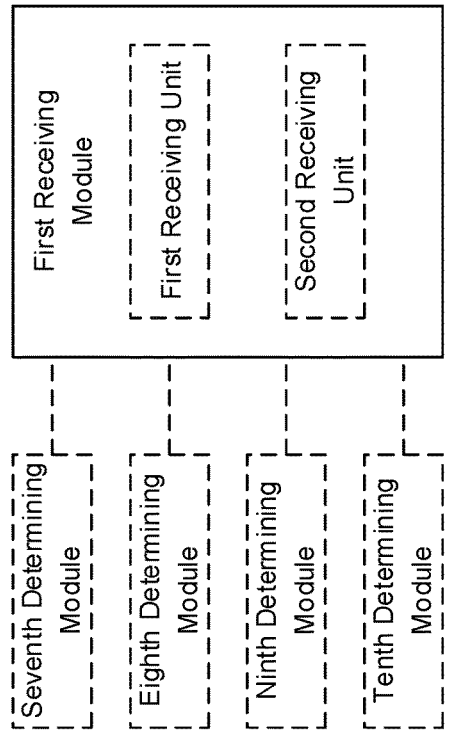
FIG. 10 is a third schematic diagram showing an apparatus for signaling configuration according to an embodiment of the present disclosure.

In an embodiment, an apparatus applied in a UE for signaling configuration is provided, as shown in FIG. 10. The apparatus includes: a first receiving module configured to receive a special subframe configuration. The special subframe configuration indicates at least that an UpPTS occupies N time-domain symbols in a special subframe, where N is an integer and $3 \leq N \leq 10$.

Optionally, the first receiving module can include a first receiving unit configured to receive a first special subframe configuration and a second special subframe configuration; or a second receiving unit configured to receive the second special subframe configuration. The first special subframe configuration indicates at least that the UpPTS occupies M time-domain symbols in the special subframe, where M is an integer and $1 \leq M \leq 2$. The second special subframe configuration indicates at least that the UpPTS occupies N time-domain symbols in the special subframe, where N is an integer and $3 \leq N \leq 10$.

Optionally, the first special subframe configuration can be a normal special subframe configuration and the second special subframe configuration can be an extended special subframe configuration.

Optionally, the first special subframe configuration can include one of:

Special Subframe Configuration 0: when a normal CP is used in downlink, a DwPTS in the special subframe occupies 3 time-domain symbols and the UpPTS in the special subframe occupies 1 time-domain symbol;

Special Subframe Configuration 1: when a normal CP is used in downlink, the DwPTS in the special subframe occupies 9 time-domain symbols and the UpPTS in the special subframe occupies 1 time-domain symbol;

Special Subframe Configuration 2: when a normal CP is used in downlink, the DwPTS in the special subframe occupies 10 time-domain symbols and the UpPTS in the special subframe occupies 1 time-domain symbol;

Special Subframe Configuration 3: when a normal CP is used in downlink, the DwPTS in the special subframe occupies 11 time-domain symbols and the UpPTS in the special subframe occupies 1 time-domain symbol;

Special Subframe Configuration 4: when a normal CP is used in downlink, the DwPTS in the special subframe occupies 12 time-domain symbols and the UpPTS in the special subframe occupies 1 time-domain symbol;

Special Subframe Configuration 5: when a normal CP is used in downlink, the DwPTS in the special subframe occupies 3 time-domain symbols and the UpPTS in the special subframe occupies 2 time-domain symbols;

Special Subframe Configuration 6: when a normal CP is used in downlink, the DwPTS in the special subframe occupies 9 time-domain symbols and the UpPTS in the special subframe occupies 2 time-domain symbols;

Special Subframe Configuration 7: when a normal CP is used in downlink, the DwPTS in the special subframe occupies 10 time-domain symbols and the UpPTS in the special subframe occupies 2 time-domain symbols;

Special Subframe Configuration 8: when a normal CP is used in downlink, the DwPTS in the special subframe occupies 11 time-domain symbols and the UpPTS in the special subframe occupies 2 time-domain symbols; or Special Subframe Configuration 9: when a normal CP is used in downlink, the DwPTS in the special subframe occupies 6 time-domain symbols and the UpPTS in the special subframe occupies 2 time-domain symbols.

Optionally, the second special subframe configuration can include: Special Subframe Configuration 10: when a normal CP is used in downlink, the DwPTS in the special subframe occupies P time-domain symbols and the UpPTS in the special subframe occupies N time-domain symbol, where P is an integer, P+N≤13 and P≥1.

Optionally, the apparatus can further include one of:

a seventh determining module coupled to the first receiving module and configured to determine a number of time-domain symbols occupied by the DwPTS in the special subframe as indicated in the second special subframe configuration, based on a number of time-domain symbols occupied by the DwPTS in the special subframe as indicated in the first special subframe configuration;

an eighth determining module coupled to the first receiving module and configured to determine a number of time-domain symbols occupied by a GP in the special subframe as indicated in the second special subframe configuration, based on the number of time-domain symbols occupied by the DwPTS in the special subframe as indicated in the first special subframe configuration and the number of time-domain symbols occupied by the UpPTS in the special subframe as indicated in the second special subframe configuration;

a ninth determining module coupled to the first receiving module and configured to determine the number of time-domain symbols occupied by the GP in the special subframe as indicated in the second special subframe configuration, based on the number of time-domain symbols occupied by the GP in the special subframe as indicated in the first special subframe configuration; or a tenth determining module coupled to the first receiving module and configured to determine the number of time-domain symbols occupied by the DwPTS in the special subframe as indicated in the second special subframe configuration, based on the number of time-domain symbols occupied by the GP in the special subframe as indicated in the first special subframe configuration and the number of time-domain symbols occupied by the UpPTS in the special subframe as indicated in the second special subframe configuration.

Optionally, the seventh determining module can be configured to determine, when the first special subframe configuration indicates that the DwPTS in the special subframe occupies P time-domain symbols, that the number of time-domain symbols occupied by the DwPTS in the special subframe as indicated in the second special subframe configuration is P, where P is an integer and P≥1.

Optionally, the eighth determining module can be configured to determine, when the first special subframe configuration indicates that the DwPTS in the special subframe occupies P time-domain symbols, that the number of time-domain symbols occupied by the GP in the special subframe as indicated in the second special subframe configuration is 14−N−P, where P is an integer, P≥1 and 14−N−P≥1.

Optionally, the ninth determining module can be configured to determine, when the first special subframe configuration indicates that the GP in the special subframe occupies Q time-domain symbols, that the number of time-domain symbols occupied by the GP in the special subframe as indicated in the second special subframe configuration is Q, where Q is an integer and Q≥1.

Optionally, the tenth determining module can be configured to determine, when the first special subframe configuration indicates that the GP in the special subframe occupies Q time-domain symbols, that the number of time-domain symbols occupied by the DwPTS in the special subframe as indicated in the second special subframe configuration is 14−N−Q, where Q is an integer, Q≥1 and 14−N−Q≥1.

Optionally, the first receiving module can be configured to receive the first special subframe configuration via a System Information Block (SIB) broadcast signaling message; and/or receiving, by the UE, the second special subframe configuration via a predetermined signaling message. The predetermined signaling message includes one of a SIB broadcast signaling message or a higher layer Radio Resource Control (RRC) signaling message.

In an embodiment, an apparatus applied in a UE for signaling configuration is provided, as shown in FIG. 11. The apparatus includes: a second receiving module configured to receive a predetermined signaling message. The predetermined signaling message is for updating at least one of: a number of time-domain symbols, among time-domain symbols occupied by a GP in a special subframe, that are available for Sounding Reference Signal (SRS) transmission; or a number of time-domain symbols occupied by an UpPTS to be added in the special subframe.

Optionally, the apparatus can further include: a third receiving module configured to receive a special subframe configuration, for indicating a number of time-domain symbols occupied by a DwPTS, a number of time-domain symbols occupied by the GP and a number of time-domain symbols occupied by the UpPTS in the special subframe before the updating.

Optionally, the apparatus can further include an eleventh determining module configured to determine a number of time-domain symbols occupied by the DwPTS, a number of time-domain symbols occupied by the GP and a number of time-domain symbols occupied by the UpPTS in the special subframe after the updating, based on the special subframe configuration and the predetermined signaling message.

Optionally, the eleventh determining module can include a fourth determining unit configured to determine, when the predetermined signaling message is for updating only the number of time-domain symbols, among the time-domain symbols occupied by the GP in the special subframe, that are available for SRS transmission, determine the number of time-domain symbols occupied by the DwPTS, the number of time-domain symbols occupied by the GP and the number of time-domain symbols occupied by the UpPTS in the special subframe after the updating to be the same as those before the updating.

Optionally, the eleventh determining module can include one of: a fifth determining unit configured to determine, when the predetermined signaling message is for updating at least the number of time-domain symbols occupied by the UpPTS to be added in the special subframe, the number of time-domain symbols occupied by the DwPTS in the special subframe after the updating to be the same as that before the updating; or a sixth determining unit configured to determine, when the predetermined signaling message is for updating at least the number of time-domain symbols occupied by the UpPTS to be added in the special subframe, the number of time-domain symbols occupied by the GP in the special subframe after the updating to be the same as that before the updating.

Optionally, the number of time-domain symbols, among the time-domain symbols occupied by the GP in the special subframe, that are available for SRS transmission after the updating and/or the number of time-domain symbols occupied by the UpPTS to be added in the special subframe after the updating can be determined based on at least one of: a radius of a cell in which the UE is located, a number of active UEs in the cell in which the UE is located, or a special subframe configuration of the special subframe before the updating.

Optionally, the SRS can include at least one of a periodic SRS and an aperiodic SRS.

In an embodiment, an apparatus applied in a base station for signaling configuration is provided, as shown in FIG. 12. The apparatus includes a transmitting module configured to signal a first special subframe configuration and a second special subframe configuration to a UE via a first signaling message and a second signaling message. The first special subframe configuration is determined by the base station and the UE based on the first signaling message, and the second special subframe configuration is determined by the base station and the UE based on the first signaling message and the second signaling message or based on the second signaling message.

Optionally, the transmitting module can be configured to select the first special subframe configuration and the second special subframe configuration from a set of special subframe configurations, and transmit the first special subframe configuration and the second special subframe configuration to the UE via the first signaling message and the second signaling message, respectively. The first signaling message and the second signaling message are each a broadcast signaling message carried in a System Information Block (SIB) for indicating special subframe configuration. Alternatively, the transmitting module can be configured to select the first special subframe configuration from the set of special subframe configurations, transmit the first special subframe configuration to the UE via the first signaling message, and indicate the second special subframe configuration to the UE via the second signaling message. The first signaling message is a broadcast signaling message carried in a SIB for indicating the first special subframe configuration, and the second signaling message is a broadcast signaling message carried in a SIB or in a UE-specific Radio Resource Control (RRC) signaling message for indicating the second special subframe configuration. A special subframe indicated in the first special subframe configuration contains M time-domain symbols for Sounding Reference Signal (SRS) transmission or M UpPTS symbols, where M is an integer and $1 \leq M \leq 2$. A special subframe indicated in the second special subframe configuration contains N time-domain symbols for SRS transmission or N UpPTS symbols, where N is an integer and $3 \leq N \leq 10$.

Optionally, the first special subframe configuration can be a normal special subframe configuration and the second special subframe configuration can be an extended special subframe configuration.

Optionally, the first special subframe configuration can include one of:

Special Subframe Configuration 0: when a normal CP is used in downlink, a DwPTS in the special subframe occupies 3 time-domain symbols and the UpPTS in the special subframe occupies 1 time-domain symbol;

Special Subframe Configuration 1: when a normal CP is used in downlink, the DwPTS in the special subframe occupies 9 time-domain symbols and the UpPTS in the special subframe occupies 1 time-domain symbol;

Special Subframe Configuration 2: when a normal CP is used in downlink, the DwPTS in the special subframe occupies 10 time-domain symbols and the UpPTS in the special subframe occupies 1 time-domain symbol;

Special Subframe Configuration 3: when a normal CP is used in downlink, the DwPTS in the special subframe occupies 11 time-domain symbols and the UpPTS in the special subframe occupies 1 time-domain symbol;

Special Subframe Configuration 4: when a normal CP is used in downlink, the DwPTS in the special subframe occupies 12 time-domain symbols and the UpPTS in the special subframe occupies 1 time-domain symbol;

Special Subframe Configuration 5: when a normal CP is used in downlink, the DwPTS in the special subframe occupies 3 time-domain symbols and the UpPTS in the special subframe occupies 2 time-domain symbols;

Special Subframe Configuration 6: when a normal CP is used in downlink, the DwPTS in the special subframe occupies 9 time-domain symbols and the UpPTS in the special subframe occupies 2 time-domain symbols;

Special Subframe Configuration 7: when a normal CP is used in downlink, the DwPTS in the special subframe occupies 10 time-domain symbols and the UpPTS in the special subframe occupies 2 time-domain symbols;

Special Subframe Configuration 8: when a normal CP is used in downlink, the DwPTS in the special subframe occupies 11 time-domain symbols and the UpPTS in the special subframe occupies 2 time-domain symbols; or Special Subframe Configuration 9: when a normal CP is used in downlink, the DwPTS in the special subframe occupies 6 time-domain symbols and the UpPTS in the special subframe occupies 2 time-domain symbols.

Optionally, the second special subframe configuration can be one of a plurality of special subframe configurations satisfying a condition that: when a normal CP is used in downlink, the DwPTS in the special subframe occupies P time-domain symbols and the UpPTS in the special subframe occupies N time-domain symbol, where P is an integer, $P+N \leq 13$ and $P \geq 1$.

Optionally, the second special subframe configuration can be one of a plurality of special subframe configurations satisfying a condition that: when a normal CP is used in downlink, the DwPTS in the special subframe occupies P time-domain symbols and the UpPTS in the special subframe occupies N time-domain symbol, where P is an integer, $P+N \leq 13$ and $6 \leq P \leq 8$, or when a normal CP is used in downlink, the DwPTS in the special subframe occupies P time-domain symbols and the UpPTS in the special subframe occupies N time-domain symbol, where P is an integer, $P+N \leq 13$ and $1 \leq P \leq 5$.

Optionally, the apparatus can further include a determining module configured to:

determine the first special subframe configuration based on the first signaling message, so as to obtain a number of time-domain symbols occupied by the DwPTS or a number of time-domain symbols occupied by a GP in the first special subframe configuration; and determine a number of time-domain symbols occupied by the UpPTS in the second special subframe configuration based on the second signaling message, and determine a number of time-domain symbols occupied by the DwPTS or a number of time-domain symbols occupied by the GP in the second special subframe configuration, based on the number of time-domain symbols occupied by the DwPTS in the first special subframe configuration; or determine the number of time-domain symbols occupied by the UpPTS in the second special subframe configuration based on the second signaling message, and determine the number of time-domain symbols occupied by the DwPTS or the number of time-domain symbols occupied by the GP in the second special subframe configuration, based on the number of time-domain symbols occupied by the GP in the first special subframe configuration.

Optionally, the determining module can be configured to determine the number of time-domain symbols occupied by the DwPTS or the number of time-domain symbols occupied by the GP in the second special subframe configuration based on the number of time-domain symbols occupied by the DwPTS in the first special subframe configuration by:

determining the number of time-domain symbols occupied by the DwPTS in the second special subframe configuration to be equal to the number of time-domain symbols occupied by the DwPTS in the first special subframe configuration, or determining the number of time-domain symbols occupied by the GP in the second special subframe configuration to be equal to a value obtained by subtracting the number of time-domain symbols occupied by the UpPTS in the second special subframe configuration and the number of time-domain symbols occupied by the DwPTS in the first special subframe configuration from 14, i.e., (14–the number of time-domain symbols occupied by the UpPTS in the second special subframe configuration–the number of time-domain symbols occupied by the DwPTS in the first special subframe configuration).

Optionally, the determining module can be configured to determine the number of time-domain symbols occupied by the DwPTS or the number of time-domain symbols occupied by the GP in the second special subframe configuration based on the number of time-domain symbols occupied by the GP in the first special subframe configuration by:

determining the number of time-domain symbols occupied by the DwPTS in the second special subframe configuration to be equal to a value obtained by subtracting the number of time-domain symbols occupied by the UpPTS in the second special subframe configuration and the number of time-domain symbols occupied by the GP in the first special subframe configuration from 14, i.e., (14–the number of time-domain symbols occupied by the UpPTS in the second special subframe configuration–the number of time-domain symbols occupied by the GP in the first special subframe configuration), or determining the number of time-domain symbols occupied by the GP in the second special subframe configuration to be equal to the number of time-domain symbols occupied by the GP in the first special subframe configuration.

Optionally, when the second signaling message is a System Information Block (SIB) broadcast signaling message and the SIB broadcast signaling message is configured by the base station or configured by the base station to be valid, the second signaling message can indicate at least one of: a number of time-domain symbols occupied by the UpPTS in the special subframe for the UE is larger than 3; a number of time-domain symbols occupied by the DwPTS in the special subframe for the UE equals to a number of time-domain symbols occupied by the DwPTS indicated in the first special subframe configuration; or a number of time-domain symbols occupied by the GP in the special subframe for the UE equals to a number of time-domain symbols occupied by the GP indicated in the first special subframe configuration. Alternatively, when the second signaling message is a Radio Resource Control (RRC) signaling message, the second signaling message can indicate at least one of: the number of time-domain symbols occupied by the UpPTS in the special subframe for the UE equals to 1 or 2; the number of time-domain symbols occupied by the UpPTS in the special subframe for the UE is larger than 3 and the number of time-domain symbols occupied by the DwPTS in the special subframe for the UE equals to the number of time-domain symbols occupied by the DwPTS indicated in the first special subframe configuration; or the number of time-domain symbols occupied by the UpPTS in the special subframe for the UE is larger than 3 and the number of time-domain symbols occupied by the GP in the special subframe for the UE equals to the number of time-domain symbols occupied by the GP indicated in the first special subframe configuration.

In an embodiment, an apparatus applied in a UE for signaling configuration is provided, as shown in FIG. 13. The apparatus includes a receiving module configured to receive a first special subframe configuration and a second special subframe configuration via a first signaling message and a second signaling message transmitted from a base station. The first special subframe configuration is determined by the base station and the UE based on the first signaling message, and the second special subframe configuration is determined by the base station and the UE based on the first signaling message and the second signaling message or based on the second signaling message.

Optionally, the receiving module can be configured to receive the first special subframe configuration via the first signaling message and the second special subframe configuration via the second signaling message. The first signaling message and the second signaling message are each a broadcast signaling message carried in a System Information Block (SIB) for indicating special subframe configuration. Alternatively, the receiving module can be configured to receive the first special subframe configuration via the first signaling message, and information indicating the second special subframe configuration via the second signaling message. The first signaling message is a broadcast signaling message carried in a SIB for indicating the first special subframe configuration, and the second signaling message is a broadcast signaling message carried in a SIB or in a UE-specific Radio Resource Control (RRC) signaling message for indicating the second special subframe configuration. A special subframe indicated in the first special subframe configuration contains M time-domain symbols for Sounding Reference Signal (SRS) transmission or M UpPTS symbols, where M is an integer and $1 \leq M \leq 2$. A special subframe indicated in the second special subframe configuration contains N time-domain symbols for SRS transmission or N UpPTS symbols, where N is an integer and $3 \leq N \leq 10$.

Optionally, the first special subframe configuration can be a normal special subframe configuration and the second special subframe configuration can be an extended special subframe configuration.

Optionally, the first special subframe configuration can include one of:

Special Subframe Configuration 0: when a normal CP is used in downlink, a DwPTS in the special subframe occupies 3 time-domain symbols and the UpPTS in the special subframe occupies 1 time-domain symbol;

Special Subframe Configuration 1: when a normal CP is used in downlink, the DwPTS in the special subframe occupies 9 time-domain symbols and the UpPTS in the special subframe occupies 1 time-domain symbol;

Special Subframe Configuration 2: when a normal CP is used in downlink, the DwPTS in the special subframe occupies 10 time-domain symbols and the UpPTS in the special subframe occupies 1 time-domain symbol;

Special Subframe Configuration 3: when a normal CP is used in downlink, the DwPTS in the special subframe occupies 11 time-domain symbols and the UpPTS in the special subframe occupies 1 time-domain symbol;

Special Subframe Configuration 4: when a normal CP is used in downlink, the DwPTS in the special subframe occupies 12 time-domain symbols and the UpPTS in the special subframe occupies 1 time-domain symbol;

Special Subframe Configuration 5: when a normal CP is used in downlink, the DwPTS in the special subframe occupies 3 time-domain symbols and the UpPTS in the special subframe occupies 2 time-domain symbols;

Special Subframe Configuration 6: when a normal CP is used in downlink, the DwPTS in the special subframe occupies 9 time-domain symbols and the UpPTS in the special subframe occupies 2 time-domain symbols;

Special Subframe Configuration 7: when a normal CP is used in downlink, the DwPTS in the special subframe occupies 10 time-domain symbols and the UpPTS in the special subframe occupies 2 time-domain symbols;

Special Subframe Configuration 8: when a normal CP is used in downlink, the DwPTS in the special subframe occupies 11 time-domain symbols and the UpPTS in the special subframe occupies 2 time-domain symbols; or Special Subframe Configuration 9: when a normal CP is used in downlink, the DwPTS in the special subframe occupies 6 time-domain symbols and the UpPTS in the special subframe occupies 2 time-domain symbols.

Optionally, the second special subframe configuration can be one of a plurality of special subframe configurations satisfying a condition that: when a normal CP is used in downlink, the DwPTS in the special subframe occupies P time-domain symbols and the UpPTS in the special subframe occupies N time-domain symbol, where P is an integer, $P+N \leq 13$ and $P \geq 1$.

Optionally, the second special subframe configuration can be one of a plurality of special subframe configurations satisfying a condition that: when a normal CP is used in downlink, the DwPTS in the special subframe occupies P time-domain symbols and the UpPTS in the special subframe occupies N time-domain symbol, where P is an integer, $P+N \leq 13$ and $6 \leq P \leq 8$, or when a normal CP is used in downlink, the DwPTS in the special subframe occupies P time-domain symbols and the UpPTS in the special subframe occupies N time-domain symbol, where P is an integer, $P+N \leq 13$ and $1 \leq P \leq 5$.

Optionally, the apparatus can further include a determining module configured to:

determine the first special subframe configuration based on the first signaling message, so as to obtain a number of time-domain symbols occupied by the DwPTS or a number of time-domain symbols occupied by a GP in the first special subframe configuration; and determine a number of time-domain symbols occupied by the UpPTS in the second special subframe configuration based on the second signaling message, and determine a number of time-domain symbols occupied by the DwPTS or a number of time-domain symbols occupied by the GP in the second special subframe configuration, based on the number of time-domain symbols occupied by the DwPTS in the first special subframe configuration; or determine the number of time-domain symbols occupied by the UpPTS in the second special subframe configuration based on the second signaling message, and determine the number of time-domain symbols occupied by the DwPTS or the number of time-domain symbols occupied by the GP in the second special subframe configuration, based on the number of time-domain symbols occupied by the GP in the first special subframe configuration.

Optionally, the determining module can be configured to determine the number of time-domain symbols occupied by the DwPTS or the number of time-domain symbols occupied by the GP in the second special subframe configuration based on the number of time-domain symbols occupied by the DwPTS in the first special subframe configuration by:

determining the number of time-domain symbols occupied by the DwPTS in the second special subframe configuration to be equal to the number of time-domain symbols occupied by the DwPTS in the first special subframe configuration, or determining the number of time-domain symbols occupied by the GP in the second special subframe configuration to be equal to a value obtained by subtracting the number of time-domain symbols occupied by the UpPTS in the second special subframe configuration and the number of time-domain symbols occupied by the DwPTS in the first special subframe configuration from 14, i.e., (14−the number of time-domain symbols occupied by the UpPTS in the second special subframe configuration−the number of time-domain symbols occupied by the DwPTS in the first special subframe configuration).

Optionally, the determining module can be configured to determine the number of time-domain symbols occupied by the DwPTS or the number of time-domain symbols occupied by the GP in the second special subframe configuration based on the number of time-domain symbols occupied by the GP in the first special subframe configuration by:

determining the number of time-domain symbols occupied by the DwPTS in the second special subframe configuration to be equal to a value obtained by subtracting the number of time-domain symbols occupied by the UpPTS in the second special subframe configuration and the number of time-domain symbols occupied by the GP in the first special subframe configuration from 14, i.e., (14−the number of time-domain symbols occupied by the UpPTS in the second special subframe configuration−the number of time-domain symbols occupied by the GP in the first special subframe configuration), or determining the number of time-domain symbols occupied by the GP in the second special subframe configuration to be equal to the number of time-domain symbols occupied by the GP in the first special subframe configuration.

Optionally, when the second signaling message is a System Information Block (SIB) broadcast signaling message and the SIB broadcast signaling message is configured by the base station or configured by the base station to be valid, the second signaling message can indicate at least one of: a number of time-domain symbols occupied by the UpPTS in the special subframe for the UE is larger than 3; a number of time-domain symbols occupied by the DwPTS in the special subframe for the UE equals to a number of time-domain symbols occupied by the DwPTS indicated in the first special subframe configuration; or a number of time-domain symbols occupied by the GP in the special subframe for the UE equals to a number of time-domain symbols occupied by the GP indicated in the first special subframe configuration. Alternatively, when the second signaling message is a Radio Resource Control (RRC) signaling message, the second signaling message can indicate at least one of: the number of time-domain symbols occupied by the UpPTS in the special subframe for the UE equals to 1 or 2; the number of time-domain symbols occupied by the UpPTS in the special subframe for the UE is larger than 3 and the number of time-domain symbols occupied by the DwPTS in the special subframe for the UE equals to the number of time-domain symbols occupied by the DwPTS indicated in the first special subframe configuration; or the number of time-domain symbols occupied by the UpPTS in the special subframe for the UE is larger than 3 and the number of time-domain symbols occupied by the GP in the special subframe for the UE equals to the number of time-domain symbols occupied by the GP indicated in the first special subframe configuration.

It should be noted that each of the above-described modules can be implemented by means of software or hardware, and the latter can be implemented in, but not limited to, the following manner: the above-mentioned modules can be located at the same processor, or can be distributed over a plurality of processors.

According to an embodiment of the present disclosure, a software product is provided. The software can perform the methods described in the above embodiments and optional embodiments.

According to an embodiment of the present disclosure, a computer readable storage medium is also provided. In this embodiment, the computer readable storage medium can be configured to store the above software.

In the following, the optional embodiments will be described and explained.

In an optional embodiment of the present disclosure, a method applied in a TDD system for signaling configuration is provided. A first special subframe configuration and a second special subframe configuration are signaled to a UE via a first signaling message and a second signaling message. Here, the first special subframe configuration is determined by a base station and the UE based on the first signaling message, and the second special subframe configuration is determined by the base station and the UE based on the first signaling message and the second signaling message. Alternatively, a number of GP symbols available for SRS transmission in a special subframe can be indicated, such that an amount of resources for SRS transmission can be increased. Thus, while providing a backward compatibility, the optional embodiment of the present disclosure can solve the problem in the related art associated with reduced number of UEs in the LTE-A system where SRSs are transmitted using multiple antennas, increase the amount of SRS resources available in the LTE-A system and increase the number of the UEs that can be admitted in the LTE-A system.

In an optional embodiment of the present disclosure, a first scheme is to add one or more configurations having UpPTS>2 in a related special subframe configuration table. In the added configuration(s), the DwPTS can be fixed or can be associated with legacy configuration(s) (the current embodiment mainly relates to the first scheme).

In a second scheme, instead of add configuration(s), a set of rules (e.g., equal number of symbols for DwPTS or GP) can be predefined between the base station and the terminal, in combination with a related special subframe configuration signaling message (i.e., a first type of signaling message) and an added signaling message (i.e., a second type of signaling message, which can be carried in a common broadcast signaling message in SIB 1 for a cell or in a UE-specific RRC signaling message).

Optional Embodiment 1

This embodiment can be applied in a TDD system in which an uplink-downlink configuration is set to 1 in accordance with the configuration information shown in Table 1. A normal CP is adopted in both downlink and uplink subframes.

For a UE of Release 12 or any previous release, referred to as legacy UE, a base station can signal a first special subframe configuration to it via a first signaling message. The number of time-domain symbols occupied by each of DwPTS, GP and UpPTS in the first special subframe configuration can be obtained from Table 2. Assuming Configuration 6 is adopted, the numbers of time-domain symbols occupied by the DwPTS, GP and UpPTS are 9, 3 and 2, respectively.

Figure 4:
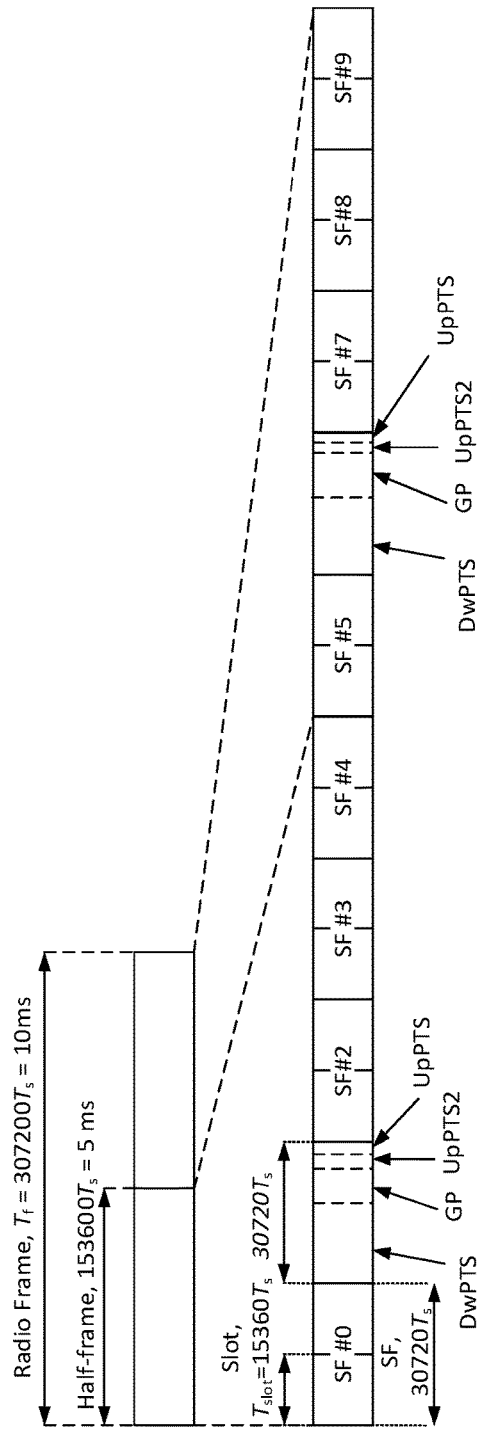
FIG. 4 is a schematic diagram showing time-domain positions for transmitting an SRS in UpPTS2 according to an optional embodiment of the present disclosure.

For a UE of Release 13 or any subsequent release, referred to as new UE, a base station can signal a second special subframe configuration to it via a second signaling message. The number of time-domain symbols occupied by each of DwPTS, GP and UpPTS in the second special subframe configuration can be obtained from Table 3. If there is no requirement for a high SRS capacity, one of Configurations 0~9, each having one or two UpPTS symbols, can be adopted. If there is a requirement for a high SRS capacity, Configuration 10, having four UpPTS symbols, can be adopted, such that the multiplexing capacity of SRSs can be significantly increased. As shown in FIG. 4, an UpPTS added and available for SRS transmission is denoted as UpPTS2, and the existing UpPTS available for SRS transmission in the pre-Release 13 system is denoted as UpPTS.

Since the base station can provide UEs in a cell with the special subframe configurations by means of system broadcast (in SIB), it will simultaneously signal the special subframe configuration for legacy UEs and the special subframe configuration for new UEs via the first signaling message and the second signaling message, respectively. At the receiving side, a legacy UE without the SRS capacity enhancement function of Release 13 will ignore the second special subframe configuration for new UEs. A new UE can interpret both special subframe configurations. If Configuration 10 is signaled, the length of UpPTS represents four time-domain symbols and the length of DwPTS is denoted as k, the value of which depends on the special subframe configuration for legacy UEs and can be represented in either one of the following schemes:

1. The length k represents the number of time-domain Orthogonal Frequency Division Multiplexing (OFDM) symbols equal to the number of DwPTS symbols in the special subframe configuration for legacy UEs.

2. Assuming that the number of time-domain symbols occupied by the GP in the special subframe configuration for legacy UEs is g, the length k represents the number of time-domain OFDM symbols=10-g when the normal CP is used for an uplink subframe, or 8-g when the extended CP is used for an uplink subframe.

TABLE 3

Special Subframe Configuration (DwPTS/GP/UpPTS Length)

| | Normal CP, Downlink | | | Extended CP, Downlink | | |
|---|---|---|---|---|---|---|
| | | UpPTS | | | UpPTS | |
| Special Subframe Configuration | DwPTS | Normal CP, Uplink | Extended CP, Uplink | DwPTS | Normal CP, Uplink | Extended CP, Uplink |
| 0  | 6592 · $T_s$  | 2192 · $T_s$ | 2560 · $T_s$ | 7680 · $T_s$  | 2192 · $T_s$ | 2560 · $T_s$ |
| 1  | 19760 · $T_s$ |              |              | 20480 · $T_s$ |              |              |
| 2  | 21952 · $T_s$ |              |              | 23040 · $T_s$ |              |              |
| 3  | 24144 · $T_s$ |              |              | 25600 · $T_s$ |              |              |
| 4  | 26336 · $T_s$ |              |              | 7680 · $T_s$  | 4384 · $T_s$ | 5120 · $T_s$ |
| 5  | 6592 · $T_s$  | 4384 · $T_s$ | 5120 · $T_s$ | 20480 · $T_s$ |              |              |
| 6  | 19760 · $T_s$ |              |              | 23040 · $T_s$ |              |              |
| 7  | 21952 · $T_s$ |              |              | 12800 · $T_s$ |              |              |
| 8  | 24144 · $T_s$ |              |              | —            | —           | —           |
| 9  | 13168 · $T_s$ |              |              | —            | —           | —           |
| 10 | k             | 8768 · $T_s$ | 10240 · $T_s$| —            | —           | —           |

A new UE can obtain the number of time-domain symbols occupied by each of DwPTS, GP and UpPTS from the first special subframe configuration and the second special subframe configuration, and can transmit an SRS in the UpPTS.

Alternatively, a new UE can obtain the number of time-domain symbols occupied by each of DwPTS, GP and UpPTS in the second special subframe configuration from Table 4. In this case, the length of UpPTS represents three time-domain symbols and the length of DwPTS is denoted as k, the value of which depends on the special subframe configuration for legacy UEs and can be represented in either one of the following schemes:

1. The length k represents the number of time-domain OFDM symbols equal to the number of DwPTS symbols in the special subframe configuration for legacy UEs.

2. Assuming that the number of time-domain symbols occupied by the GP in the special subframe configuration for legacy UEs is g, the length k represents the number of time-domain OFDM symbols=11-g when the normal CP is used for an uplink subframe, or 9-g when the extended CP is used for an uplink subframe.

accordance with the configuration information shown in Table 1. A normal CP is adopted in both downlink and uplink subframes.

For a UE of Release 12 or any previous release, referred to as legacy UE, a base station can signal a first special subframe configuration to it via a first signaling message. The number of time-domain symbols occupied by each of DwPTS, GP and UpPTS in the first special subframe configuration can be obtained from Table 2. Assuming Configuration 6 is adopted, the numbers of time-domain symbols occupied by the DwPTS, GP and UpPTS are 9, 3 and 2, respectively.

For a UE of Release 13 or any subsequent release, referred to as new UE, a base station can signal a second special subframe configuration to it via a second signaling message. Here, the second signaling message can be a broadcast signaling message carried in a SIB. When the SIB broadcast signaling message is configured by the base station or configured by the base station to be valid, the signaling message can indicate that the number of time-domain symbols occupied by the UpPTS in the special

TABLE 4

Special Subframe Configuration (DwPTS/GP/UpPTS Length)

| | Normal CP, Downlink | | | Extended CP, Downlink | | |
|---|---|---|---|---|---|---|
| | | UpPTS | | | UpPTS | |
| Special Subframe Configuration | DwPTS | Normal CP, Uplink | Extended CP, Uplink | DwPTS | Normal CP, Uplink | Extended CP, Uplink |
| 0  | 6592 · $T_s$  | 2192 · $T_s$ | 2560 · $T_s$ | 7680 · $T_s$  | 2192 · $T_s$ | 2560 · $T_s$ |
| 1  | 19760 · $T_s$ |              |              | 20480 · $T_s$ |              |              |
| 2  | 21952 · $T_s$ |              |              | 23040 · $T_s$ |              |              |
| 3  | 24144 · $T_s$ |              |              | 25600 · $T_s$ |              |              |
| 4  | 26336 · $T_s$ |              |              | 7680 · $T_s$  | 4384 · $T_s$ | 5120 · $T_s$ |
| 5  | 6592 · $T_s$  | 4384 · $T_s$ | 5120 · $T_s$ | 20480 · $T_s$ |              |              |
| 6  | 19760 · $T_s$ |              |              | 23040 · $T_s$ |              |              |
| 7  | 21952 · $T_s$ |              |              | 12800 · $T_s$ |              |              |
| 8  | 24144 · $T_s$ |              |              | —            | —           | —           |
| 9  | 13168 · $T_s$ |              |              | —            | —           | —           |
| 10 | k             | 6576 · $T_s$ | 7680 · $T_s$ | —            | —           | —           |

Optional Embodiment 2

This embodiment can be applied in a TDD system in which an uplink-downlink configuration is set to 1 in subframe for the UE is larger than 3; the number of time-domain symbols occupied by the DwPTS in the special subframe for the UE equals to the number of time-domain symbols occupied by the DwPTS indicated in the first special subframe configuration; or the number of time-domain symbols occupied by the GP in the special subframe for the UE equals to the number of time-domain symbols occupied by the GP indicated in the first special subframe configuration.

Optional Embodiment 3

This embodiment can be applied in a TDD system in which an uplink-downlink configuration is set to 1 in accordance with the configuration information shown in Table 1. A normal CP is adopted in both downlink and uplink subframes.

For a UE of Release 12 or any previous release, referred to as legacy UE, a base station can signal a first special subframe configuration to it via a first signaling message. The number of time-domain symbols occupied by each of DwPTS, GP and UpPTS in the first special subframe configuration can be obtained from Table 2. Assuming Configuration 6 is adopted, the numbers of time-domain symbols occupied by the DwPTS, GP and UpPTS are 9, 3 and 2, respectively.

For a UE of Release 13 or any subsequent release, referred to as new UE, a base station can signal a second special subframe configuration to it via a second signaling message. Here, the second signaling message can be an RRC signaling message and can indicate a number of states, including: the number of time-domain symbols occupied by the UpPTS in the special subframe equals to 1 or 2; the number of time-domain symbols occupied by the UpPTS in the special subframe is larger than 3 and the number of time-domain symbols occupied by the DwPTS in the special subframe equals to the number of time-domain symbols occupied by the DwPTS indicated in the first special subframe configuration; or the number of time-domain symbols occupied by the UpPTS in the special subframe is larger than 3 and the number of time-domain symbols occupied by the GP in the special subframe equals to the number of time-domain symbols occupied by the GP indicated in the first special subframe configuration. For example, these states are shown in Table 5 below:

TABLE 5

States indicated when the second signaling message is an RRC signaling message

| State of Signaling message | Description |
| --- | --- |
| 00 | The first special subframe configuration is used. |
| 01 | The number of time-domain symbols occupied by the UpPTS in the special subframe is 4 and the number of time-domain symbols occupied by the DwPTS in the special subframe equals to the number of time-domain symbols occupied by the DwPTS indicated in the first special subframe configuration. |
| 10 | The number of time-domain symbols occupied by the UpPTS in the special subframe is 4 and the number of time-domain symbols occupied by the GP in the special subframe equals to the number of time-domain symbols occupied by the GP indicated in the first special subframe configuration. |
| 11 | Reserved |

Optional Embodiment 4

A base station can configure for a UE a number of time-domain symbols occupied by a GP or a newly added UpPTS in a special subframe via an RRC signaling message or a SIB broadcast signaling message. Here, the time-domain symbols occupied by the GP (i.e., the GP for SRS transmission) or the newly added UpPTS are provided for SRS transmission.

The base station can configure the number of time-domain symbols occupied by the GP or the newly added UpPTS in the special subframe based on a radius of a cell and/or a number of active UEs. For example, in a cell having a large radius of coverage (e.g., in a UMa scenario), the base station can select the special subframe configuration as a configuration having a long GP, e.g., Configuration 5. In Configuration 5, the numbers of time-domain symbols occupied by the DwPTS, GP and UpPTS are 3, 9 and 2, respectively. It can be seen that it has a long GP. In order to increase the multiplexing capacity of SRSs, the base station can configure the number of time-domain symbols in the GP available for SRS transmission via an RRC signaling message. Assuming that the number of time-domain symbols in the GP as configured via the signaling message is 2, 2 out of 9 time-domain symbols occupied by the GP can be used for SRS transmission. The two time-domain symbols in the GP are immediately adjacent to the UpPTS.

Figure 5:
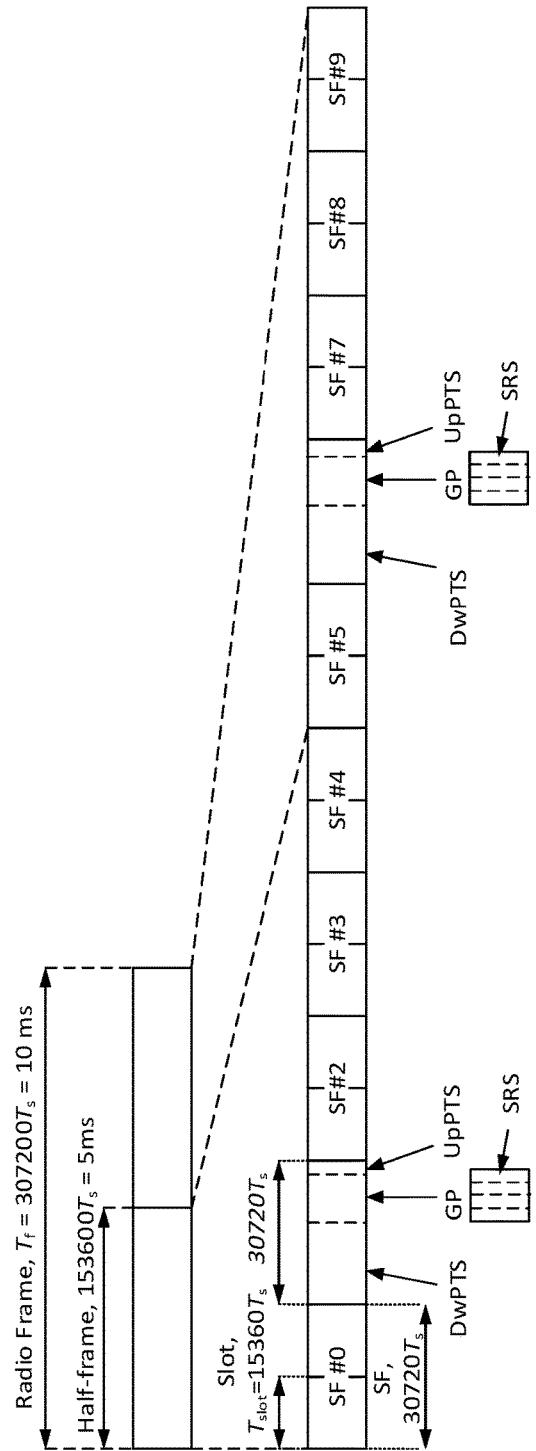
FIG. 5 is a schematic diagram showing time-domain positions for transmitting an SRS on GP according to an optional embodiment of the present disclosure.

In a cell having a small radius of coverage (e.g., in a UMi scenario), the base station can select the special subframe configuration as a configuration having a short GP, e.g., Configuration 1. In Configuration 1, the numbers of time-domain symbols occupied by the DwPTS, GP and UpPTS are 9, 4 and 1, respectively. Assuming that the base station configures two time-domain symbols in the GP available for SRS transmission via an RRC signaling message, as shown in FIG. 5, the two time-domain symbols immediately adjacent to the UpPTS in the GP are available for SRS transmission.

Optional Embodiment 5

In this embodiment, a method applied in a RDD system for signaling configuration is provided. The method includes: signaling, by a base station, a first special subframe configuration and a second special subframe configuration to a UE via a first signaling message and a second signaling message. The first special subframe configuration is determined by the base station and the UE based on the first signaling message, and the second special subframe configuration is determined by the base station and the UE based on the first signaling message and the second signaling message.

Optionally, for a new UE, if it receives both the first signaling message and the second signaling message, it can determine the special subframe configuration for the new UE based on the second signaling message while ignoring the first signaling message. If it receives the first signaling message only, it can determine the special subframe configuration for the new UE based on the first signaling message.

For the first special subframe configuration, the set of special subframe configurations includes: Special Subframe Configuration 0 and Special Subframe Configurations 1~9, as shown in Table 2.

For the second special subframe configuration, the set of special subframe configurations includes: Special Subframe Configuration 10, as shown in Table 3 or 4; or Special Subframe Configuration 10 and Special Subframe Configuration 11, as shown in Table 6 or 7.

TABLE 6

Special Subframe Configuration (DwPTS/GP/UpPTS Length)

| Special Subframe Configuration | Normal CP, Downlink | | | Extended CP, Downlink | | |
|---|---|---|---|---|---|---|
| | | UpPTS | | | UpPTS | |
| | DwPTS | Normal CP, Uplink | Extended CP, Uplink | DwPTS | Normal CP, Uplink | Extended CP, Uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $17568 \cdot T_s$ | $6576 \cdot T_s$ | $7680 \cdot T_s$ | — | — | — |
| 11 | $13168 \cdot T_s$ | $6576 \cdot T_s$ | $7680 \cdot T_s$ | — | — | — |

TABLE 7

Special Subframe Configuration (DwPTS/GP/UpPTS Length)

| Special Subframe Configuration | Normal CP, Downlink | | | Extended CP, Downlink | | |
|---|---|---|---|---|---|---|
| | | UpPTS | | | UpPTS | |
| | DwPTS | Normal CP, Uplink | Extended CP, Uplink | DwPTS | Normal CP, Uplink | Extended CP, Uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |
| 10 | $13168 \cdot T_s$ | $13152 \cdot T_s$ | $15360 \cdot T_s$ | — | — | — |
| 11 | $13168 \cdot T_s$ | $8768 \cdot T_s$ | $10240 \cdot T_s$ | — | — | — |

It can be appreciated by those skilled in the art that the above-described modules or steps of the present disclosure can be implemented by a general purpose computing device, and can be centralized at one single computing device or distributed over a network of multiple computing devices. Optionally, they can be implemented by means of computer executable program codes, which can be stored in a storage device and executed by one or more computing devices. In some cases, the steps shown or described herein may be performed in an order different from the one described above. Alternatively, they can be implemented separately in individual integrated circuit modules, or one or more of the modules or steps can be implemented in one single integrated circuit module. Thus, the present disclosure is not limited to any particular hardware, software, and combination thereof.

The foregoing is merely illustrative of the preferred embodiments of the present disclosure and is not intended to limit the present disclosure. Various changes and modifications may be made by those skilled in the art. Any modifications, equivalent alternatives or improvements that are made without departing from the spirits and principles of the present disclosure are to be encompassed by the scope of the present disclosure.

INDUSTRIAL APPLICABILITY

The present disclosure provides a method for signaling configuration, capable of solving the problem associated with low multiplexing capacity of SRSs and improving the multiplexing capacity of SRSs.

What is claimed is:
1. A method for signaling configuration, comprising:
transmitting, by a base station, a first signaling message to a mobile device indicating a special subframe configuration, and
transmitting, by the base station, a second signaling message to the mobile device to update the special subframe configuration,
wherein a special subframe configured according to the special subframe configuration includes M symbols occupied by an Uplink Pilot Time Slot (UpPTS), M being an integer and 1≤M≤2, and wherein the second signaling message indicates a number of symbols occupied by the UpPTS to be added to the special subframe such that the special subframe includes N symbols occupied by the UpPTS, N being an integer and 3≤N≤10, and wherein a number of symbols occupied by a Downlink Pilot Time Slot (DwPTS) in the special subframe remains unchanged.

2. The method of claim 1, wherein the special subframe includes, when a normal Cyclic Prefix (CP) is used in a downlink transmission, P symbols occupied by the DwPTS, P being an integer, P+N≤13 and P≥1.

3. The method of claim 1, wherein
the second signaling message is a System Information Block (SIB) broadcast signaling message, or
a Radio Resource Control (RRC) signaling message.

4. The method of claim 1, further comprising:
receiving a Sounding Reference Signal (SRS) transmission using the N symbols in the special subframe.

5. A method for signaling configuration, comprising:
receiving, by a mobile device, a first signaling message from a base station indicating a special subframe configuration,
receiving, by the mobile device, a second signaling message from the base station to update the first special subframe configuration,
wherein a special subframe configured according to the special subframe configuration includes M symbols occupied by an Uplink Pilot Time Slot (UpPTS), M being an integer and 1≤M≤2, and
wherein the second signaling message indicates a number of symbols occupied by the UpPTS to be added to the special subframe such that the special subframe includes N symbols occupied by UpPTS, N being an integer and 3≤N≤10, and wherein a number of symbols occupied by a Downlink Pilot Time Slot (DwPTS) in the first special subframe remains unchanged.

6. The method of claim 5, wherein the special subframe includes, when a normal Cyclic Prefix (CP) is used in a downlink transmission, P symbols occupied by the DwPTS, P being an integer, P+N≤13 and P≥1.

7. The method of claim 5, wherein
the second signaling message is a System Information Block (SIB) broadcast signaling message, or a Radio Resource Control (RRC) signaling message.

8. The method of claim 5, further comprising:
transmitting a Sounding Reference Signal (SRS) using the N symbols in the special subframe.

9. An apparatus for signaling configuration, comprising:
a transmitting module configured to transmit, to a mobile device, a first signaling message indicating a special subframe configuration, the transmitting module further configured to transmit, to the mobile device, a second signaling message to update the special subframe configuration,
wherein a special subframe configured according to the special subframe configuration includes M symbols occupied by an Uplink Pilot Time Slot (UpPTS), M being an integer and 1≤M≤2, and
wherein the second signaling message indicates a number of symbols occupied by the UpPTS to be added to the special subframe such that the special subframe includes N symbols occupied by the UpPTS, N being an integer and 3≤N≤10, and wherein a number of symbols occupied by a Downlink Pilot Time Slot (DwPTS) in the first special subframe remains unchanged.

10. The apparatus of claim 9, wherein the special subframe includes, when a normal CP is used in a downlink transmission, P symbols occupied by the DwPTS, P being an integer, P+N≤13 and P≥1.

11. The apparatus of claim 9, wherein
the second signaling message is a System Information Block (SIB) broadcast signaling message, or a Radio Resource Control (RRC) signaling message.

12. The apparatus of claim 9, further comprising:
a receiving module configured to receive a Sounding Reference Signal (SRS) transmission using the N symbols in the special subframe.

13. An apparatus for signaling configuration, comprising:
a receiving module configured to receive a first signaling message from a base station indicating a special subframe configuration, the receiving module further configured to receive a second signaling message from the base station to update the special subframe configuration,
wherein a special subframe configured according to the special subframe configuration includes M symbols occupied by an Uplink Pilot Time Slot (UpPTS), M being an integer and 1≤M≤2, and
wherein the second signaling message indicates a number of symbols occupied by the UpPTS to be added to the special subframe such that the special subframe includes N symbols occupied by the UpPTS, N being an integer and 3≤N≤10, and wherein a number of symbols occupied by a Downlink Pilot Time Slot (DwPTS) in the first special subframe remains unchanged.

14. The apparatus of claim 13, wherein the special subframe includes, when a normal Cyclic Prefix (CP) is used in a downlink transmission, P symbols occupied by the DwPTS, P being an integer, P+N≤13 and P≥1.

15. The apparatus of claim 13, wherein
the second signaling message is a System Information Block (SIB) broadcast signaling message, or a Radio Resource Control (RRC) signaling message.

16. The apparatus of claim 13, further comprising:
a transmitting module configured to transmit a Sounding Reference Signal (SRS) using the N symbols in the special subframe.

* * * * *